US011922881B2

(12) United States Patent
Wang et al.

(10) Patent No.: US 11,922,881 B2

(45) Date of Patent: Mar. 5, 2024

(54) PIXEL CIRCUIT AND DRIVING METHOD THEREOF, ARRAY SUBSTRATE AND DISPLAY APPARATUS

(71) Applicant: BOE TECHNOLOGY GROUP CO., LTD., Beijing (CN)

(72) Inventors: Can Wang, Beijing (CN); Han Yue, Beijing (CN); Can Zhang, Beijing (CN); Minghua Xuan, Beijing (CN); Ming Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/167,166

(22) Filed: Feb. 10, 2023

(65) Prior Publication Data

US 2023/0197007 A1 Jun. 22, 2023

Related U.S. Application Data

(63) Continuation of application No. 16/956,200, filed as application No. PCT/CN2019/100628 on Aug. 14, 2019, now Pat. No. 11,615,747.

(51) Int. Cl.
*G09G 3/3241* (2016.01)

(52) U.S. Cl.
CPC ....... *G09G 3/3241* (2013.01); *G09G 2310/08* (2013.01)

(58) Field of Classification Search
None
See application file for complete search history.

(56) References Cited

U.S. PATENT DOCUMENTS 10,755,641 B2 * 8/2020 Miyasaka ............ G09G 3/3233
11,158,242 B2 * 10/2021 Yue .......................... G09G 3/32
11,688,331 B2 * 6/2023 Hwang ................ G09G 3/2081
345/204

(Continued)

FOREIGN PATENT DOCUMENTS

CN 101908309 A 12/2010
CN 108320700 A 7/2018

(Continued)

OTHER PUBLICATIONS

The International Search Report and Written Opinion dated Apr. 24, 2020; PCT/CN2019/00628.

(Continued)

*Primary Examiner* — Matthew Yeung

(57) ABSTRACT

Disclosed are a pixel circuit and a driving method thereof, an array substrate and a display apparatus. The pixel circuit includes a pixel sub-circuit. The pixel sub-circuit includes a first adjusting circuit and a second adjusting circuit. The first adjusting circuit is configured to receive a first data signal and a light-emitting control signal to control a magnitude of a driving current used for driving a light-emitting element to emit light; the second adjusting circuit is configured to receive a second data signal and a time control signal to control a time duration in which the driving current is applied to the light-emitting element; and the time control signal changes within a time period during which the light-emitting control signal allows the driving current to be generated.

20 Claims, 13 Drawing Sheets

(56) References Cited

U.S. PATENT DOCUMENTS

| | | | | |
|---|---|---|---|---|
| 2003/0010985 | A1* | 1/2003 | Shen | H10K 59/179 257/79 |
| 2010/0309174 | A1 | 12/2010 | Yuan et al. | |
| 2018/0151112 | A1 | 5/2018 | Song et al. | |
| 2018/0182289 | A1* | 6/2018 | Jung | H10K 59/131 |
| 2018/0182294 | A1 | 6/2018 | Radhakrishnan et al. | |
| 2018/0301080 | A1 | 10/2018 | Shigeta et al. | |
| 2019/0130835 | A1* | 5/2019 | Ka | G09G 3/3275 |
| 2020/0035145 | A1* | 1/2020 | Tseng | G09G 3/2014 |
| 2020/0135110 | A1 | 4/2020 | Yokoyama et al. | |
| 2020/0312223 | A1 | 10/2020 | Yuan et al. | |
| 2021/0174736 | A1 | 6/2021 | Yang et al. | |
| 2021/0407376 | A1* | 12/2021 | Yue | G09G 3/3233 |
| 2022/0383800 | A1 | 12/2022 | Cong et al. | |

FOREIGN PATENT DOCUMENTS

| | | | |
|---|---|---|---|
| CN | 109493790 | A | 3/2019 |
| CN | 109817161 | A | 5/2019 |
| CN | 109830208 | A | 5/2019 |
| CN | 109859682 | A | 6/2019 |
| CN | 109872680 | A | 6/2019 |
| CN | 109920368 | A | 6/2019 |
| CN | 109920371 | A | 6/2019 |
| CN | 110010057 | A | 7/2019 |
| CN | 110021263 | A | 7/2019 |
| CN | 110021264 | A | 7/2019 |

OTHER PUBLICATIONS

The Extended European Search Report dated Jun. 3, 2022; Appln. No. 19931499.8.

USPTO RR dated Mar. 21, 2022 in connection with U.S. Appl. No. 16/956,200.

USPTO NFOA dated Aug. 3, 2022 in connection with U.S. Appl. No. 16/956,200.

USPTO NOA dated Nov. 23, 2022 in connection with U.S. Appl. No. 16/956,200.

EPO Communication dated Jun. 12, 2023; Appln. No. 19 931 499.8.

* cited by examiner

PIXEL CIRCUIT AND DRIVING METHOD THEREOF, ARRAY SUBSTRATE AND DISPLAY APPARATUS

CROSS REFERENCE TO RELATED APPLICATIONS

This application is a continuation of U.S. patent application Ser. No. 16/956,200, filed Jun. 19, 2020, which was the National Stage of International Application No. PCT/CN2019/100628, filed Aug. 14, 2019, the entireties of which are hereby incorporated herein by reference.

TECHNICAL FIELD

The embodiments of the present disclosure relate to a pixel circuit and a driving method thereof, an array substrate and a display apparatus.

BACKGROUND

Light emitting diode (LED) display technology is a display technology in which a pixel unit is formed based on an LED. In the LED display technology, organic light emitting diodes (OLEDs) are increasingly used in display fields such as mobile phones, tablet computers, and digital cameras, etc. In addition, micron-sized light emitting diodes (μLEDs, e.g., micro LEDs with a grain size of less than 100 μm) and quantum dot light emitting diodes (QLEDs), etc., also have good market prospects in the display fields, and thus are increasingly valued by the industry.

SUMMARY

At least one embodiment of the present disclosure provides a pixel circuit, which includes a first adjusting circuit and a second adjusting circuit. The first adjusting circuit is configured to receive a first data signal and a light emitting control signal to control a magnitude of a driving current used for driving a light emitting element to emit light; the second adjusting circuit is configured to receive a second data signal and a time control signal to control a time duration in which the driving current is applied to the light emitting element; and the time control signal changes within a time period during which the light emitting control signal allows the driving current to be generated.

For example, in the pixel circuit provided by some embodiments of the present disclosure, the second adjusting circuit comprises a first control circuit and a second control circuit; the first control circuit comprises a first control terminal, a first terminal and a second terminal; the second control circuit is configured to control an electric level of the first control terminal of the first control circuit based on the second data signal and the time control signal, so as to control a time duration in which the driving current flows through the first terminal and the second terminal of the first control circuit.

For example, in the pixel circuit provided by some embodiments of the present disclosure, the first control circuit comprises a control transistor; a gate electrode of the control transistor serves as the first control terminal of the first control circuit and is electrically connected with the second control circuit, a first electrode of the control transistor serves as the first terminal of the first control circuit, and a second electrode of the control transistor serves as the second terminal of the first control circuit.

For example, in the pixel circuit provided by some embodiments of the present disclosure, the second control circuit comprises a second writing circuit and a voltage adjusting circuit; the second writing circuit is configured to write the second data signal into a first node in response to a second scan signal; the voltage adjusting circuit is configured to store the second data signal being written, and to adjust an electric level of the first node in response to the time control signal.

For example, in the pixel circuit provided by some embodiments of the present disclosure, the second control circuit further comprises a third writing circuit; the third writing circuit is configured to write a third data signal into the voltage adjusting circuit as the time control signal in response to a third scan signal.

For example, in the pixel circuit provided by some embodiments of the present disclosure, the second writing circuit comprises a second writing transistor, and the voltage adjusting circuit comprises a voltage adjusting transistor and a second storage capacitor; a gate electrode of the second writing transistor is connected with a second scan signal terminal to receive the second scan signal, a first electrode of the second writing transistor is connected with a second data signal terminal to receive the second data signal, and a second electrode of the second writing transistor is connected with the first node; a gate electrode of the voltage adjusting transistor is connected with a time control signal terminal to receive the time control signal, a first electrode of the voltage adjusting transistor is connected with a first power terminal to receive a first power voltage, and a second electrode of the voltage adjusting transistor is connected with the first node; a first terminal of the second storage capacitor is connected with the first node, and a second terminal of the second storage capacitor is connected with the first power terminal to receive the first power voltage.

For example, in the pixel circuit provided by some embodiments of the present disclosure, the voltage adjusting circuit further comprises a time control resistor, and the first electrode of the voltage adjusting transistor is connected with the first power terminal through the time control resistor.

For example, in the pixel circuit provided by some embodiments of the present disclosure, the third writing circuit comprises a third writing transistor and a third storage capacitor; a gate electrode of the third writing transistor is connected with a third scan signal terminal to receive the third scan signal, a first electrode of the third writing transistor is connected with a third data signal terminal to receive the third data signal, and a second electrode of the third writing transistor is connected with the gate electrode of the voltage adjusting transistor; a first terminal of the third storage capacitor is connected with the gate electrode of the voltage adjusting transistor, and a second terminal of the third storage capacitor is connected with the first electrode of the voltage adjusting transistor.

For example, in the pixel circuit provided by some embodiments of the present disclosure, the first control terminal of the first control circuit is connected with the first node.

For example, in the pixel circuit provided by some embodiments of the present disclosure, the second control circuit further comprises an inverter circuit, the inverter circuit comprises an input end and an output end, the input end of the inverter circuit is connected with the first node, the output end of the inverter circuit is connected with the first control terminal of the first control circuit; the inverter circuit is configured, according to an input signal received by the input end, to generate an output signal having a phase inverse to that of the input signal, and to output the output signal to the first control terminal of the first control circuit.

For example, in the pixel circuit provided by some embodiments of the present disclosure, the inverter circuit comprises a first transistor and a second transistor; a type of the first transistor is different from a type of the second transistor; a gate electrode of the first transistor and a gate electrode of the second transistor are connected with the first node, a second electrode of the first transistor and a second electrode of the second transistor are connected with the first control terminal of the first control circuit, a first electrode of the first transistor is connected with a first voltage terminal to receive a first voltage, a first electrode of the second transistor is connected with a second voltage terminal to receive a second voltage, and the first voltage is different from the second voltage.

For example, in the pixel circuit provided by some embodiments of the present disclosure, the second writing circuit and the first adjusting circuit are respectively connected with a same data signal terminal; and the same data signal terminal is configured to provide corresponding data signals to the second writing circuit and the first adjusting circuit in different time periods, respectively.

For example, in the pixel circuit provided by some embodiments of the present disclosure, the first adjusting circuit comprises a driving circuit, a first writing circuit, a compensation circuit and a light emitting control circuit; the driving circuit comprises a second control terminal, a third terminal and a fourth terminal, and is configured to control the driving current flowing through the third terminal and the fourth terminal of the driving circuit and used for driving the light emitting element to emit light; the first writing circuit is configured to write the first data signal into the second control terminal of the driving circuit in response to a first scan signal; the compensation circuit is configured to store the first data signal being written and compensate the driving circuit in response to the first scan signal; the light emitting control circuit is configured to apply a second power voltage to the third terminal of the driving circuit in response to the light emitting control signal.

For example, in the pixel circuit provided by some embodiments of the present disclosure, the driving circuit comprises a driving transistor; a gate electrode of the driving transistor serves as the second control terminal of the driving circuit and is connected with a second node, a first electrode of the driving transistor serves as the third terminal of the driving circuit and is connected with a third node, a second electrode of the driving transistor serves as the fourth terminal of the driving circuit and is connected with a fourth node.

For example, in the pixel circuit provided by some embodiments of the present disclosure, the first writing circuit comprises a first writing transistor; a gate electrode of the first writing transistor is connected with a first scan signal terminal to receive the first scan signal, a first electrode of the first writing transistor is connected with a first data signal terminal to receive the first data signal, and a second electrode of the first writing transistor is connected with the third node.

For example, in the pixel circuit provided by some embodiments of the present disclosure, the compensation circuit comprises a compensation transistor and a first storage capacitor, a gate electrode of the compensation transistor is connected with the first scan signal terminal to receive the first scan signal, a first electrode of the compensation transistor is connected with the fourth node, a second electrode of the compensation transistor is connected with the second node, a first terminal of the first storage capacitor is connected with the second node, and a second terminal of the first storage capacitor is connected with a second power terminal.

For example, in the pixel circuit provided by some embodiments of the present disclosure, the light emitting control circuit comprises a light emitting control transistor; a gate electrode of the light emitting control transistor is connected with a light emitting control signal terminal to receive the light emitting control signal, a first electrode of the light emitting control transistor is connected with the second power terminal to receive the second power voltage, and a second electrode of the light emitting control transistor is connected with the third node.

For example, in the pixel circuit provided by some embodiments of the present disclosure, the first adjusting circuit further comprises a reset circuit; the reset circuit is configured to apply a reset voltage to the second control terminal of the driving circuit in response to a reset signal.

For example, in the pixel circuit provided by some embodiments of the present disclosure, the reset circuit comprises a reset transistor; a gate electrode of the reset transistor is connected with a reset signal terminal to receive the reset signal, a first electrode of the reset transistor is connected with a reset voltage terminal to receive the reset voltage, and a second electrode of the reset transistor is connected with the second node.

For example, in the pixel circuit provided by some embodiments of the present disclosure, the first terminal of the first control circuit is connected with the fourth terminal of the driving circuit, the second terminal of the first control circuit is connected with a first electrode of the light emitting element, and a second electrode of the light emitting element is connected with a third power terminal to receive a third power voltage.

At least one embodiment of the present disclosure further provides an array substrate, which comprises a plurality of pixel units arranged in an array. Each of the plurality of pixel units comprises the light emitting element and the pixel circuit according to any one embodiment of the present disclosure.

For example, in the array substrate provided by some embodiments of the present disclosure, the light emitting element in the pixel unit comprises a micron-sized light emitting element.

At least one embodiment of the present disclosure further provides a display apparatus, which comprises the array substrate according to any one embodiment of the present disclosure.

At least one embodiment of the present disclosure further provides a driving method corresponding to the pixel circuit according to any one embodiment of the present disclosure, which comprises: causing the first adjusting circuit to receive the first data signal and the light emitting control signal, and controlling the magnitude of the driving current used for driving the light emitting element; and causing the second adjusting circuit to receive the second data signal and the time control signal, and controlling the time duration in which the driving current is applied to the light emitting element, wherein the time control signal changes within the time period during which the light emitting control signal allows the driving current to be generated.

For example, in the driving method provided by some embodiments of the present disclosure, the second adjusting circuit comprises a first control circuit and a second control circuit, the first control circuit comprises a first control terminal, a first terminal and a second terminal, the second control circuit is configured to control an electric level of the first control terminal of the first control circuit based on the second data signal and the time control signal, so as to control a time duration in which the driving current flows through the first terminal and the second terminal of the first control circuit; the driving method comprises a light emitting stage: in the light emitting stage, cause the second control circuit to control the electric level of the first control terminal of the first control circuit based on the second data signal and the time control signal, so as to change the first control circuit from an on state to an off state, so that the time duration in which the driving current flows through the first terminal and the second terminal of the first control circuit is controlled.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
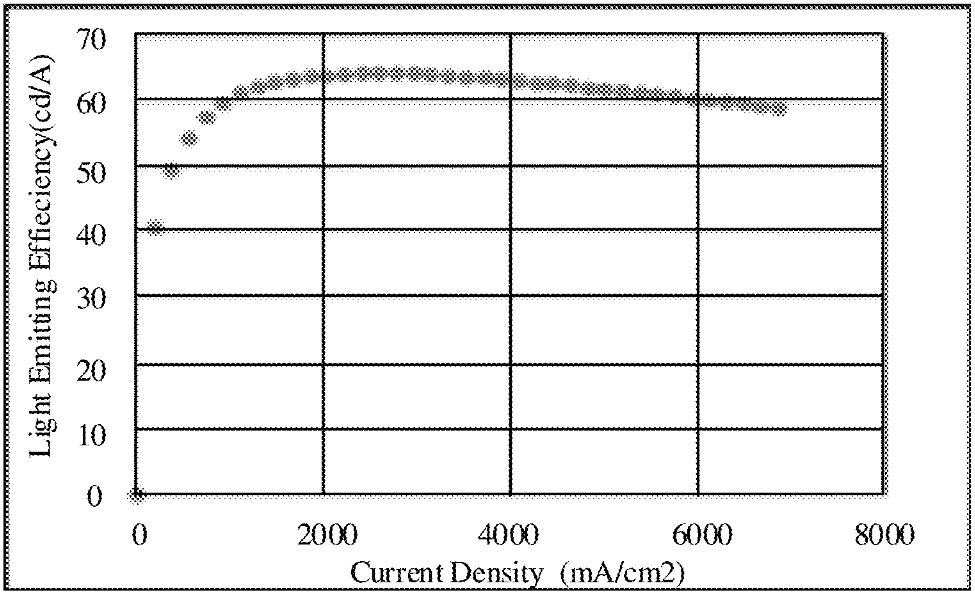
FIG. 1 shows a light emitting efficiency curve of a micron-sized light emitting diode (μLED)

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "a," "an," "the," etc., are not intended to indicate a limitation of quantity, but indicate the presence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure is described below with reference to several specific embodiments. In order to keep the following description of the embodiments of the present disclosure clear and concise, detailed descriptions of known functions and known components or elements may be omitted. When any one component or element of an embodiment of the present disclosure appears in more than one of the accompanying drawings, the component or element is denoted by a same or similar reference numeral in each of the drawings.

A display panel using a micron-sized light emitting diode (μLED) has advantages of thin thickness, light weight, low energy consumption, long service life, high luminous efficiency, fast response speed, self-luminescence, and being applicable for transparent display, etc., and has a good application prospect in display fields such as mobile phones, tablet computers, and digital cameras, etc.

FIG. 1 shows a light emitting efficiency curve of a micron-sized light emitting diode (μLED). As can be seen from FIG. 1, at a low current density (e.g., at a current density less than 1,000 mA/$cm^2$), the light emitting efficiency of the μLED is relatively low.

Figure 2A:
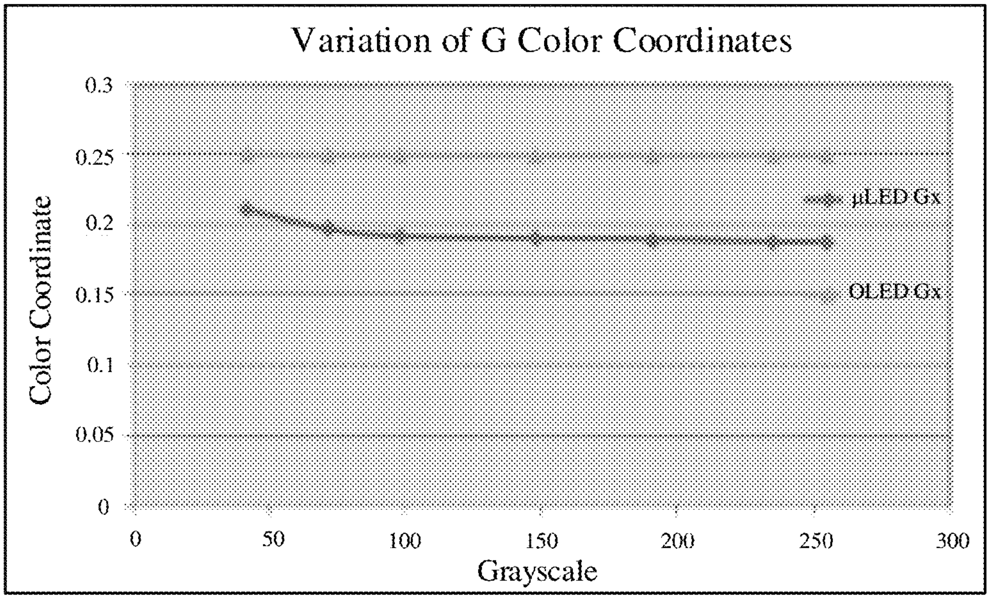
FIG. 2A and FIG. 2B are schematic comparative diagrams of variation curves of green light (G) color coordinates of a micron-sized light emitting diode (μLED) and an organic light emitting diode (OLED)
Figure 2B:
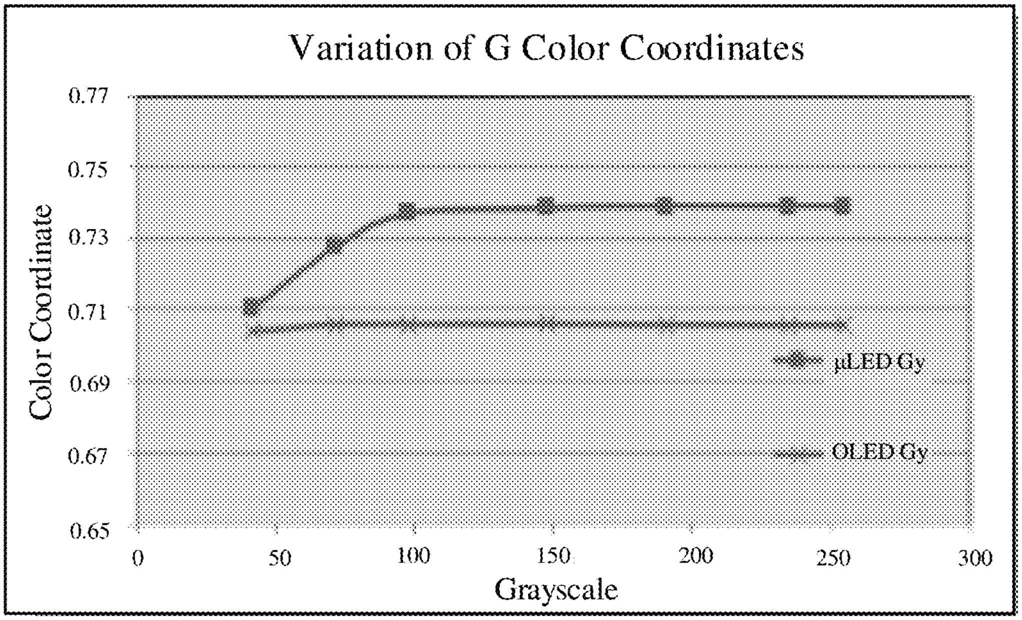

FIG. 2A and FIG. 2B are schematic comparative diagrams of variation curves of green light (G) color coordinates of a micron-sized light emitting diode (μLED) and an organic light emitting diode (OLED). FIG. 2A shows variation curves of abscissas (Gx) of the G color coordinates of the μLED and the OLED with grayscale, and FIG. 2B shows variation curves of ordinates (Gy) of the G color coordinates of the μLED and the OLED with grayscale. As can be seen from FIG. 2A and FIG. 2B, within the whole grayscale range (e.g., 0-255), the G color coordinates of the OLED substantially remains unchanged, so the light color of the OLED is relatively stable; on the other hand, with respect to the μLED, within a low grayscale range (e.g., 0-100), the G color coordinates thereof fluctuate greatly, while within a middle and high grayscale range (e.g., 100 to 255), the G color coordinates thereof fluctuate slightly; and therefore, light color stability of the μLED needs to be improved.

Generally, a μLED display panel can adopt a pixel circuit commonly used in an OLED display panel to drive the μLED to emit light. For example, the μLED display panel can adopt a 2T1C pixel circuit, that is, using two thin-film transistors (TFTs) and one storage capacitor Cs to realize a basic function of driving the μLED to emit light. Two kinds of 2T1C pixel circuits are respectively shown in FIG. 3A and FIG. 3B.

Figure 3A:
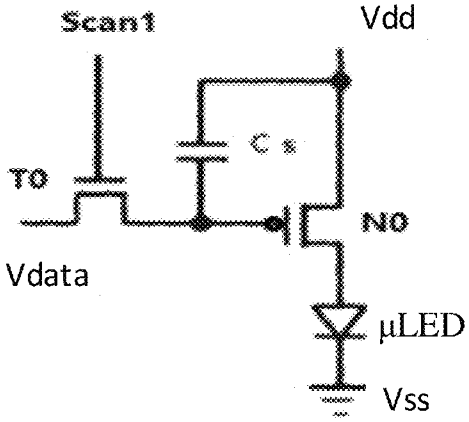
FIG. 3A is a schematic diagram of a 2T1C pixel circuit.

As shown in FIG. 3A, one 2T1C pixel circuit includes a switching transistor T0, a driving transistor N0, and a storage capacitor Cs. For example, a gate electrode of the switching transistor T0 is connected with a scan line to receive a scan signal Scan1, a source electrode of the switching transistor T0 is connected with a data signal line to receive a data signal Vdata, and a drain electrode of the switching transistor T0 is connected with a gate electrode of the driving transistor N0; a source electrode of the driving transistor N0 is connected with a first voltage terminal to receive a first voltage Vdd (e.g., a high voltage), and a drain electrode of the driving transistor N0 is connected with a positive terminal of the μLED; one terminal of the storage capacitor Cs is connected with the drain electrode of the switching transistor T0 and the gate electrode of the driving transistor N0, and the other terminal of the storage capacitor Cs is connected with the source electrode of the driving transistor N0 and the first voltage terminal; and a negative terminal of the μLED is connected with a second voltage terminal to receive a second voltage Vss (e.g., a low voltage, such as a ground voltage). A driving mode of the 2T1C pixel circuit is to control brightness (i.e., a grayscale) of a pixel via the two TFTs and the storage capacitor Cs. When the scan signal Scan1 is applied through the scan line to turn on the switching transistor T0, the data signal Vdata delivered by a data driving circuit through the data signal line will charge the storage capacitor Cs via the switching transistor T0, thereby storing the data signal Vdata in the storage capacitor Cs, and the stored data signal Vdata controls a conduction degree of the driving transistor N0, thereby controlling a magnitude of a current flowing through the driving transistor to drive the μLED to emit light, that is, the magnitude of the current determines a grayscale of light emitted by the pixel (a low current density corresponds to a low grayscale, and a high current density corresponds to a high grayscale). In the 2T1C pixel circuit shown in FIG. 3A, the switching transistor T0 is an N-type transistor and the driving transistor N0 is a P-type transistor.

Figure 3B:
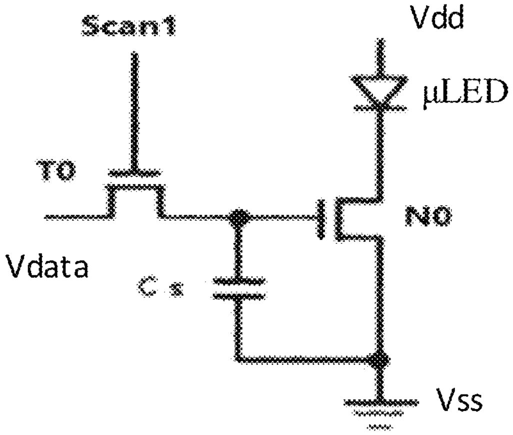
FIG. 3B is a schematic diagram of another 2T1C pixel circuit.

As shown in FIG. 3B, another 2T1C pixel circuit also includes a switching transistor T0, a driving transistor N0 and a storage capacitor Cs; but connection manners thereof are slightly changed, and the driving transistor N0 is an N-type transistor. The variations of the pixel circuit in FIG. 3B with respect to the pixel circuit in FIG. 3A include that: a positive terminal of the μLED is connected with the first voltage terminal to receive the first voltage Vdd (e.g., a high voltage), and a negative terminal of the μLED is connected with the drain electrode of the driving transistor N0; the source electrode of the driving transistor N0 is connected with the second voltage terminal to receive the second voltage Vss (e.g., a low voltage, such as a ground voltage); and one terminal of the storage capacitor Cs is connected with the drain electrode of the switching transistor T0 and the gate electrode of the driving transistor N0, and the other terminal of the storage capacitor Cs is connected with the source electrode of the driving transistor N0 and the second voltage terminal. The operation mode of the 2T1C pixel circuit is substantially the same as that of the pixel circuit shown in FIG. 3A, and details will not be repeated here.

In addition, with respect to the pixel circuits shown in FIG. 3A and FIG. 3B, the switching transistor T0 is not limited to an N-type transistor, but can also be a P-type transistor, and thus, it is only necessary to change the polarity of the scan signal Scan1 that controls the switching transistor T0 to be turned on or off, accordingly.

On the basis of the basic 2T1C pixel circuits described above, other pixel circuits with, for example, a compensating function, a reset function, etc., have been developed, and these pixel circuits can also be applied to the μLED display panel, and details will not be described here.

However, in the case where a pixel circuit commonly used in the OLED display panel is applied to the μLED display panel, because the grayscale displayed by the μLED in the pixel is completely controlled by the magnitude of the driving current (a low current corresponds to a low grayscale, and a high current corresponds to a high grayscale), the μLED cannot be ensured to operate within a current density range with relatively high light emitting efficiency and stable light color, that is, the problems of low light emitting efficiency and unstable light color, caused by that the μLED operates in a state of low current density when the μLED display panel performs a low grayscale display, cannot be solved.

At least one embodiment of the present disclosure provides a pixel circuit. The pixel sub-circuit includes a first adjusting circuit and a second adjusting circuit. The first adjusting circuit is configured to receive a first data signal and a light emitting control signal to control a magnitude of a driving current used for driving a light emitting element to emit light; the second adjusting circuit is configured to receive a second data signal and a time control signal to control a time duration in which the driving current is applied to the light emitting element; and the time control signal changes within a time period during which the light emitting control signal allows the driving current to be generated.

Some embodiments of the present disclosure further provide a driving method, an array substrate, and a display apparatus corresponding to the above-described pixel circuit.

The pixel circuit and the driving method thereof, the array substrate and the display apparatus provided by at least one embodiment of the present disclosure, can control the time duration in which the driving current is applied to the light emitting element, so that the light emitting element can realize display of various grayscales, such as a low grayscale display, by controlling the light emitting time of the light emitting element, on the premise that the light emitting element operates at a relatively high current density.

Hereinafter, some embodiments of the present disclosure and examples thereof will be described in detail with reference to the accompanying drawings.

Figure 4:
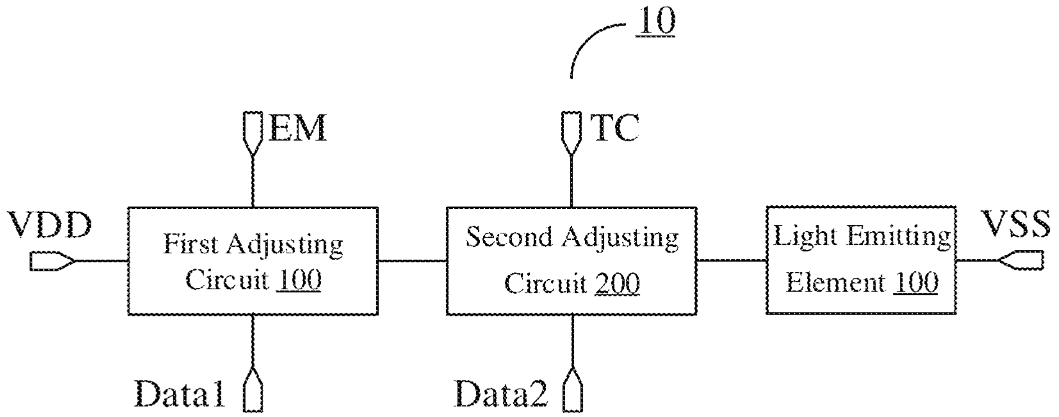
FIG. 4 is a schematic block diagram of a pixel circuit provided by at least one embodiment of the present disclosure.

FIG. 4 is a schematic block diagram of a pixel circuit provided by at least one embodiment of the present disclosure. For example, the pixel circuit 10 shown in FIG. 4 can be used in a sub-pixel of a μLED display panel. As shown in FIG. 4, the pixel circuit 10 includes a first adjusting circuit 100 and a second adjusting circuit 200.

For example, the first adjusting circuit 100 is configured to receive a first data signal Data1 and a light emitting control signal EM to control a magnitude of a driving current for driving a light emitting element 300 to emit light. For example, in some examples, the first adjusting circuit 100 can generate the driving current according to the first data signal Data1 (e.g., the magnitude of the driving current is related to the first data signal Data1), and provide, under the control of the light emitting control signal EM, the driving current to the light emitting element 300 to drive the light emitting element 300 to emit light. For example, the light emitting element 300 can be a micron-sized light emitting element, for example, a μLED (e.g., Micro-LED, Mini-LED), etc.; for example, the micron-sized light emitting element can also be a micron-sized OLED, such as a Micro-OLED, a Mini-OLED, etc.; and it should be noted that, the embodiments of the present disclosure are not limited to these cases.

For example, the second adjusting circuit 200 is configured to receive a second data signal Data2 and a time control signal TC to control a time duration in which the driving current described above is applied to the light emitting element 300, that is, the second adjusting circuit can control a length of light emitting time of the light emitting element 300. For example, in some examples, under a joint action of the second data signal Data2 and the time control signal TC, the second adjusting circuit 200 can gradually change from a state of allowing the driving current to pass through to a state of not allowing the current to pass through, that is, can control the time duration in which the driving current is generated and applied to the light emitting element 300. For example, the time control signal TC changes within a time period during which the light emitting control signal allows the driving current to be generated, and for example, the change of the time control signal TC can control the length of the light emitting time of the light emitting element 300.

It should be noted that, connection mode of the first adjusting circuit 100, the second adjusting circuit 200 and the light emitting element 300 in the pixel circuit 10 shown in FIG. 4 (the first adjusting circuit 100, the second adjusting circuit 200, and the light emitting element 300 are sequentially connected) is illustrative, and the embodiments of the present disclosure include but are not limited thereto. For example, the first adjusting circuit, the second adjusting circuit, and the light emitting element in the pixel circuit provided by the embodiments of the present disclosure can also be connected in any other connection mode, as long as corresponding functions of the foregoing first adjusting circuit and the second adjusting circuit described above can be implemented.

The pixel circuit provided by the embodiments of the present disclosure, by controlling the light emitting time of the light emitting element, can allow the light emitting element to realize display of various grayscales, such as, a low grayscale display, on the premise that the light emitting element operates at a relatively high current density. For example, a low grayscale display can be realized by improving the light emitting brightness of the light emitting element and shortening the light emitting time of the light emitting element. In the case where the light emitting element is a μLED, the μLED can be prevented from operating in a state of low current density, thereby solving the problems of low light emitting efficiency and unstable light color of the μLED.

Figure 5:
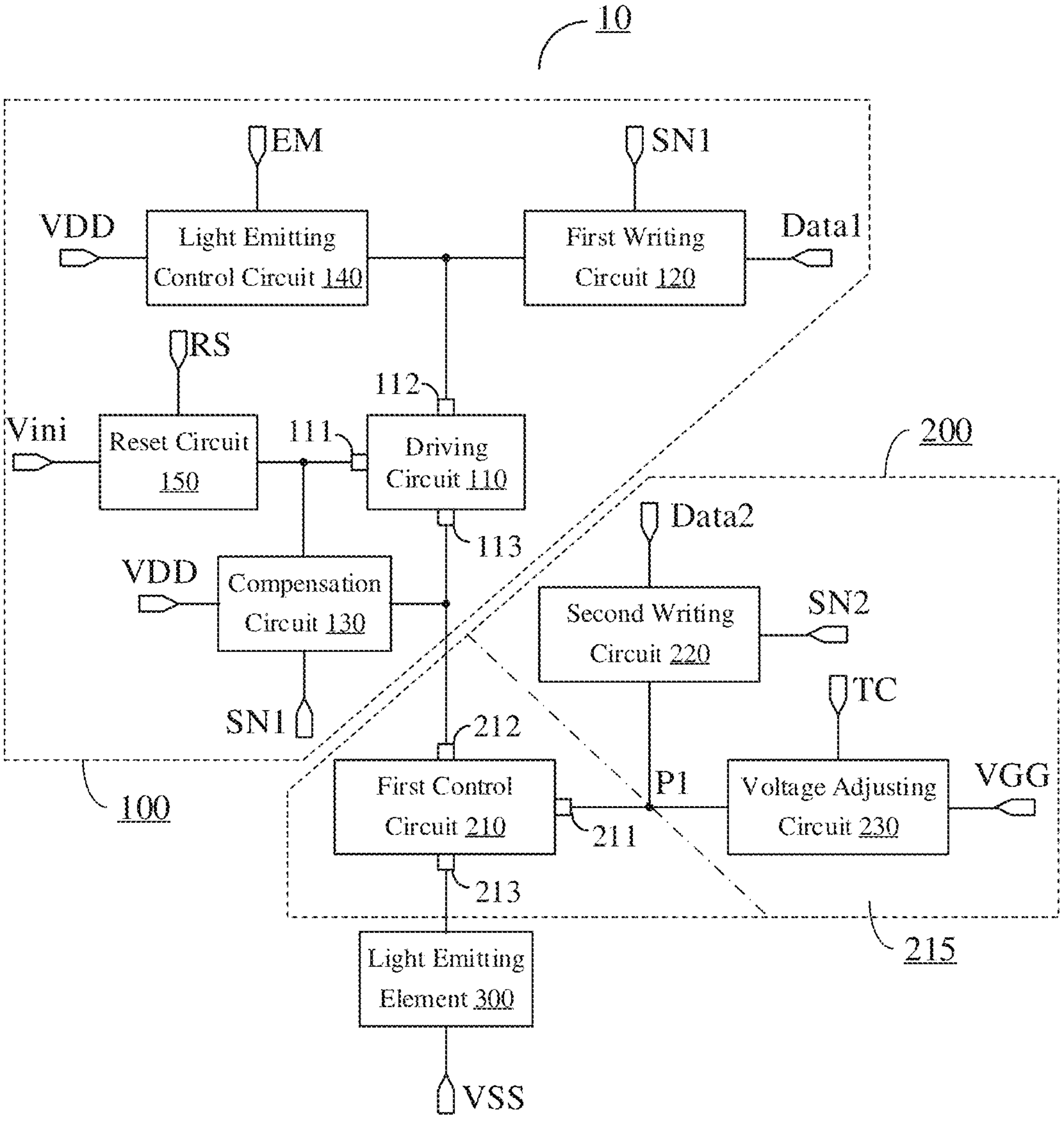
FIG. 5 is a schematic block diagram of an example of the pixel circuit shown in FIG. 4.

FIG. 5 is a schematic block diagram of an example of the pixel circuit shown in FIG. 4. For example, as shown in FIG. 5, in the pixel circuit 10, the first adjusting circuit 100 includes a driving circuit 110, a first writing circuit 120, a compensation circuit 130 and a light emitting control circuit 140.

For example, the driving circuit 110 includes a second control terminal 111, a third terminal 112, and a fourth terminal 113, and is configured to control a driving current flowing through the third terminal 112 and the fourth terminal 113 and used for driving the light emitting element 300 to emit light. For example, in a light emitting stage, the driving circuit 110 can provide the driving current to the light emitting element 300 to drive the light emitting element 300 to emit light, and can provide a corresponding driving current according to a grayscale desired to be displayed to the light emitting element 300 for light emission. It should be noted that, in the embodiments of the present disclosure, the grayscale displayed by the light emitting element is not only related to the magnitude of the driving current, but also related to the length of the time duration in which the driving current is applied to the light emitting element (i.e., the light emitting time of the light emitting element). It should also be noted that, the terms "second", "third", and "fourth" in the naming of the three terminals of the driving circuit 110 are only intended to make a distinction from the naming of three terminals in a first control circuit that will be introduced later, rather than indicating the number of terminals that the driving circuit 110 has.

For example, the first writing circuit 120 is connected with the driving circuit 110, and is configured to write the first data signal Data1 into the second control terminal 111 of the driving circuit 110 in response to a first scan signal SN1. For example, in a data writing and compensation stage, the first writing circuit 120 is turned on in response to the first scan signal SN1, thereby writing the first data signal Data1 (e.g., via the compensation circuit 130 which is turned on) to the second control terminal 111 of the driving circuit 110, so as to cause the driving circuit 110 to generate the driving current for driving the light emitting element 300 to emit light according to the first data signal Data1 in the light emitting stage.

For example, the compensation circuit 130 is connected with the driving circuit 110, and is configured to store the first data signal Data1 being written and compensate the driving circuit 110 in response to the first scan signal SN1. For example, the compensation circuit 130 includes a first storage capacitor, and the first storage capacitor can receive and store the first data signal Data1 written by the first writing circuit 120. For example, in the data writing and compensation stage, the compensation circuit 130 is turned on in response to the first scan signal SN1, and electrically connects the second control terminal 111 and the fourth terminal 113 of the driving circuit 110, so that related information of a threshold voltage of the driving circuit 110 is also stored in the first storage capacitor accordingly, and further, in a light emitting stage, the stored voltage including the information of the first data signal Data1 and the threshold voltage can be used to control the driving circuit 110, so as to cause the driving circuit 110 to generate the driving current for driving the light emitting element 300 to emit light according to the first data signal Data1 in the case where the driving circuit 110 is compensated.

For example, the light emitting control circuit 140 is connected with the driving circuit 110, and is configured to apply a second power voltage VDD to the third terminal 112 of the driving circuit 110 in response to the light emitting control signal EM. For example, in the light emitting stage, the light emitting control circuit 140 is turned on in response to the light emitting control signal EM, so that the second power voltage VDD can be applied to the third terminal 112 of the driving circuit 110, so as to cause the driving circuit 110 to generate the driving current. For example, the second power voltage VDD can be a drive voltage, such as a high voltage.

For example, in some examples, as shown in FIG. 5, the first adjusting circuit 100 can further include a reset circuit 150. For example, the reset circuit 150 is connected with the driving circuit 110, and is configured to apply a reset voltage Vini to the second control terminal 111 of the driving circuit 110 in response to a reset signal RS. For example, in an initialization stage, the reset circuit 150 is turned on in response to the reset signal RS, so that the reset voltage Vini can be applied to the second control terminal 111 of the driving circuit 110 to reset the driving circuit 110.

For example, as shown in FIG. 5, in the pixel circuit 10 provided by some embodiments, the second adjusting circuit 200 includes a first control circuit 210 and a second control circuit 215.

For example, as shown in FIG. 5, the first control circuit 210 includes a first control terminal 211, a first terminal 212 and a second terminal 213. For example, the first terminal 212 of the first control circuit 210 is connected with the fourth terminal 113 of the driving circuit 110; the second terminal 213 of the first control circuit 210 is connected with a first electrode (e.g., an anode) of the light emitting element 300, and a second electrode (e.g., a cathode) of the light emitting element 300 is connected with a third power terminal to receive a third power voltage VSS. Thus, in the light emitting stage, the time duration in which the driving current is applied to the light emitting element 300 (i.e., the light emitting time) can be controlled by controlling a time duration of an on state of the first control circuit 210. For example, the third power voltage VSS is a low voltage, such as a ground voltage.

For example, the second control circuit 215 is connected with the first control terminal 211 of the first control circuit 210; the second control circuit 215 is configured to control an electric level of the first control terminal 211 of the first control circuit 210 based on the second data signal Data2 and the time control signal TC, so as to control a time duration in which the driving current flows through the first terminal 212 and the second terminal 213 of the first control circuit 210, thereby controlling the time duration in which the driving current is applied to the light emitting element 300.

For example, in some embodiments, as shown in FIG. 5, the second control circuit 215 includes a second writing circuit 220 and a voltage adjusting circuit 230.

For example, the second writing circuit 220 is connected with a first node P1, and is configured to write the second data signal Data2 into the first node P1 in response to a second scan signal SN2. For example, in a time switch preset stage, the second writing circuit 220 is turned on in response to the second scan signal SN2, thereby writing the second data signal Data2 into the first node P1, so as to set the first control circuit 210 to an on state at a starting time point of the light emitting stage.

For example, the voltage adjusting circuit 230 is connected with the first node P1, and is configured to store the second data signal Data2 being written, and to adjust an electric level of the first node P1 in response to the time control signal TC. For example, the voltage adjusting circuit 230 includes a second storage capacitor. For example, in the time switch preset stage, the second storage capacitor can receive and store the second data signal Data2 written by the second writing circuit 220. For example, in the light emitting stage, the voltage adjusting circuit 230 is turned on in response to the time control signal TC, so that the second storage capacitor can perform charging/discharging (be charged or discharged) via the voltage adjusting circuit 230 which is turned on, that is, the voltage adjusting circuit 230 can adjust the electric level of the first node P1. For example, as the charging/discharging process of the second storage capacitor continues, the electric level of the first node P1 gradually changes, so that the first control circuit 210 can be set from an on state to an off state, that is, the time duration in which the driving current is applied to the light emitting element 300 can be controlled. For example, in some embodiments, the second data signal Data2 can be a constant signal, and the time control signal TC can be a signal with an adjustable amplitude; for example, the on degree of the voltage adjusting circuit 230 can be controlled by adjusting the amplitude of the time control signal TC, so that the charging/discharging speed of the second storage capacitor can be controlled, and further, the time in which the driving current is applied to the light emitting element 300 can be controlled.

For example, in some embodiments, as shown in FIG. 5, the first control terminal 211 of the first control circuit 210 is connected with the first node P1. In this case, the second data signal Data2 can be directly applied to the first control terminal 211 of the first control circuit 210, and can cause the first control circuit 210 to be turned on. In the light emitting stage, the voltage adjusting circuit 230 that is turned on is connected with a first power terminal to receive a first power voltage VGG; and when the charging/discharging process of the second storage capacitor ends, the electric level of the first node P1 becomes VGG, that is, the first power voltage VGG can cause the first control circuit 210 to be turned off.

Figure 6:
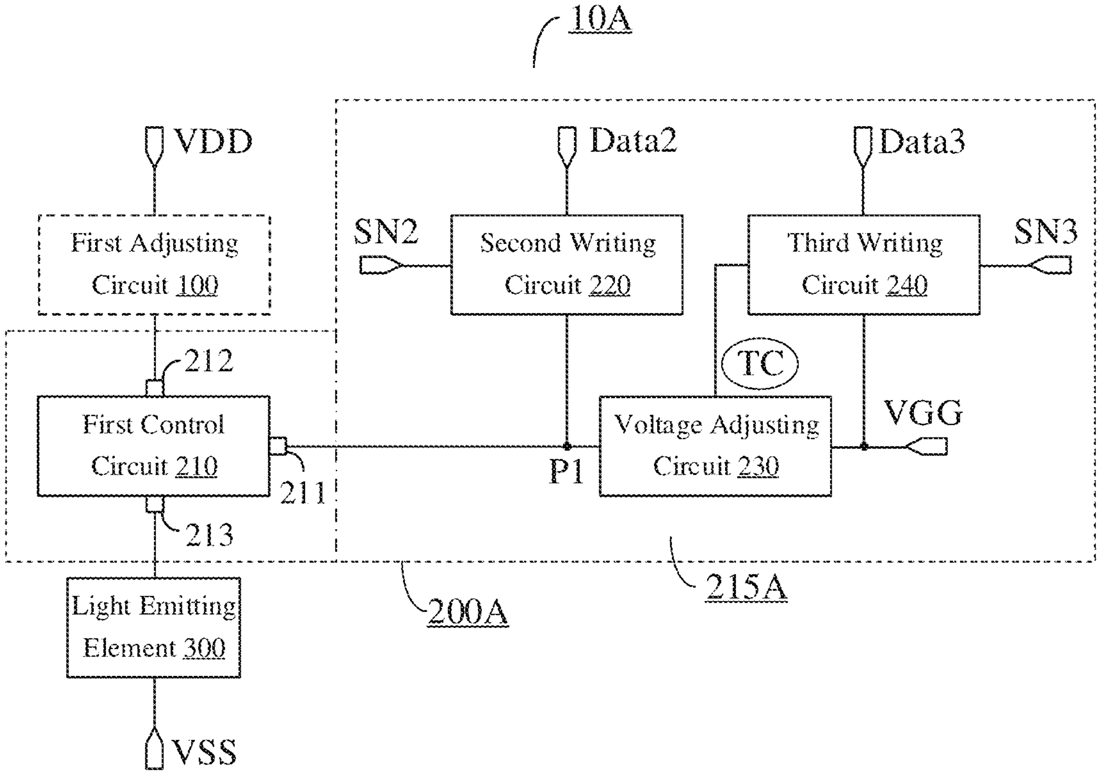
FIG. 6 is a schematic block diagram of another example of the pixel circuit shown in FIG. 4.

FIG. 6 is a schematic block diagram of another example of the pixel circuit shown in FIG. 4. As shown in FIG. 6, on the basis of the pixel circuit 10 shown in FIG. 5, a second control circuit 215A in a second adjusting circuit 200A of a pixel circuit 10A further includes a third writing circuit 240. It should be noted that, other circuit structures of the pixel circuit 10A shown in FIG. 6 are substantially the same as those of the pixel circuit 10 shown in FIG. 5, and details will not be repeated here. It should also be noted that, for clarity and conciseness, the specific circuit structure of the first adjusting circuit 100 is omitted in the pixel circuit 10A shown in FIG. 6 (the first adjusting circuit 100 in the pixel circuit 10 shown in FIG. 5 can be referred to).

As shown in FIG. 6, the third writing circuit 240 is connected with the voltage adjusting circuit 230, and is configured to write a third data signal Data3 into the voltage adjusting circuit 230 as the time control signal TC in response to a third scan signal SN3. For example, in the light emitting stage, the third writing circuit 240 is turned on in response to the third scan signal SN3, thereby writing the third data signal Data3 into the control terminal of the voltage adjusting circuit 230 as the time control signal TC.

For example, the third writing circuit 240 can include a third storage capacitor; the third storage capacitor can receive and store the third data signal Data3 being written; and thus, in the light emitting stage, the third data signal Data3 stored by the third storage capacitor can maintain an on state of the voltage adjusting circuit. For example, in the case where the second control circuit 215A includes the third writing circuit 240, the amplitude of the time control signal TC can be adjusted by adjusting an amplitude of the third data signal Data3.

Figure 7:
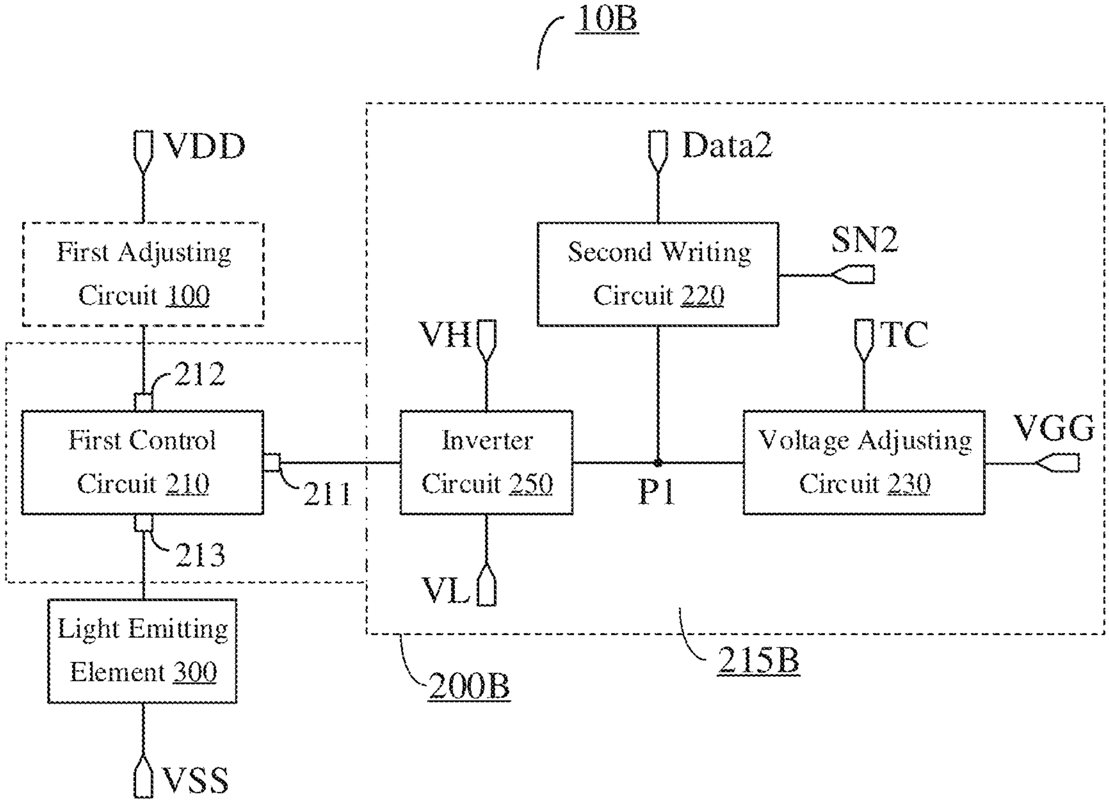
FIG. 7 is a schematic block diagram of further another example of the pixel circuit shown in FIG. 4.

FIG. 7 is a schematic block diagram of further another example of the pixel circuit shown in FIG. 4. As shown in FIG. 7, on the basis of the pixel circuit 10 shown in FIG. 5, a second control circuit 215B in a second adjusting circuit 200B of a pixel circuit 10B further includes an inverter circuit 250. It should be noted that, other circuit structures of the pixel circuit 10B shown in FIG. 7 are substantially the same as those of the pixel circuit 10 shown in FIG. 5, and details will not be repeated here. It should also be noted that, for clarity and conciseness, the specific circuit structure of the first adjusting circuit 100 is omitted in the pixel circuit 10B shown in FIG. 7 (the first adjusting circuit 100 in the pixel circuit 10 shown in FIG. 5 can be referred to).

As shown in FIG. 7, the inverter circuit 250 includes an input end and an output end; the input end of the inverter circuit 250 is connected with the first node P1, and the output end of the inverter circuit 250 is connected with the first control terminal 211 of the first control circuit 210. For example, the inverter circuit 250 is configured, according to an input signal received by the input end thereof, to generate an output signal having a phase inverse to that of an input signal, and to output the output signal to the output end thereof. For example, in the present example, the output signal is output to the first control terminal 211 of the first control circuit 210. For example, that the output signal has a phase inverse to that of the input signal refers to that: in the case where the input signal is at a high level, the output signal is at a low level; and in the case where the input signal is at a low level, the output signal is at a high level. In the embodiments of the present disclosure, taking a P-type transistor as an example, a low level (or a low voltage) refers to an electric level that can cause the P-type transistor to be turned on, and a high level (or a high voltage) refers to an electric level that can cause the P-type transistor to be turned off.

For example, as shown in FIG. 7, the inverter circuit 250 is further connected with a first voltage terminal to receive a first voltage VH and connected with a second voltage terminal to receive a second voltage VL. The first voltage VH is different from the second voltage VL. For example, the first voltage VH is a high-level voltage, and the second voltage VL is a low-level voltage. For example, in the case where the input signal at the input end of the inverter circuit 250 is at a low level, the output signal at the output end of the inverter circuit is at a high level; and in the case where the input signal at the input end of the inverter circuit 250 is at a high level, the output signal at the output end of the inverter circuit 250 is at a low level.

In the pixel circuit 10 shown in FIG. 5, in the light emitting stage, an adjusting process of the electric level of the first node P1 is a slow change process (relative to a change process of the electric level of the output signal of the inverter circuit 250); because the first node P1 is directly connected with the first control terminal 211 of the first control circuit 210, an on degree of the first control circuit 210 changes slowly as the electric level of the first node P1 changes slowly. However, in the pixel circuit 10B shown in FIG. 7, although the adjusting process of the electric level of the first node P1 is still a slow change process, yet because the first node P1 is connected with the first control terminal 211 of the first control circuit 210 through the inverter circuit 250 (a change process of the electric level of the output signal of the inverter circuit 250 is a jump process), the change process of the electric level of the first control terminal 211 of the first control circuit 210 is a jump process; and therefore, the first control circuit 210 can jump from an on state to an off state, thereby ensuring that the light emitting element 300 always operates within a current density range with relatively high light emitting efficiency and stable light color when the first control circuit 210 is in an on state.

It should be understood that, in the case where the first control circuit 210 is implemented as a same type of transistor, the second data signal used in the pixel circuit 10B shown in FIG. 7 has a phase inverse to that of the second data signal used in the pixel circuit 10 shown in FIG. 5, and meanwhile, the first power voltage used in the pixel circuit 10B shown in FIG. 7 also has a phase inverse to that of the first power voltage used in the pixel circuit 10 shown in FIG. 5.

Figure 8:
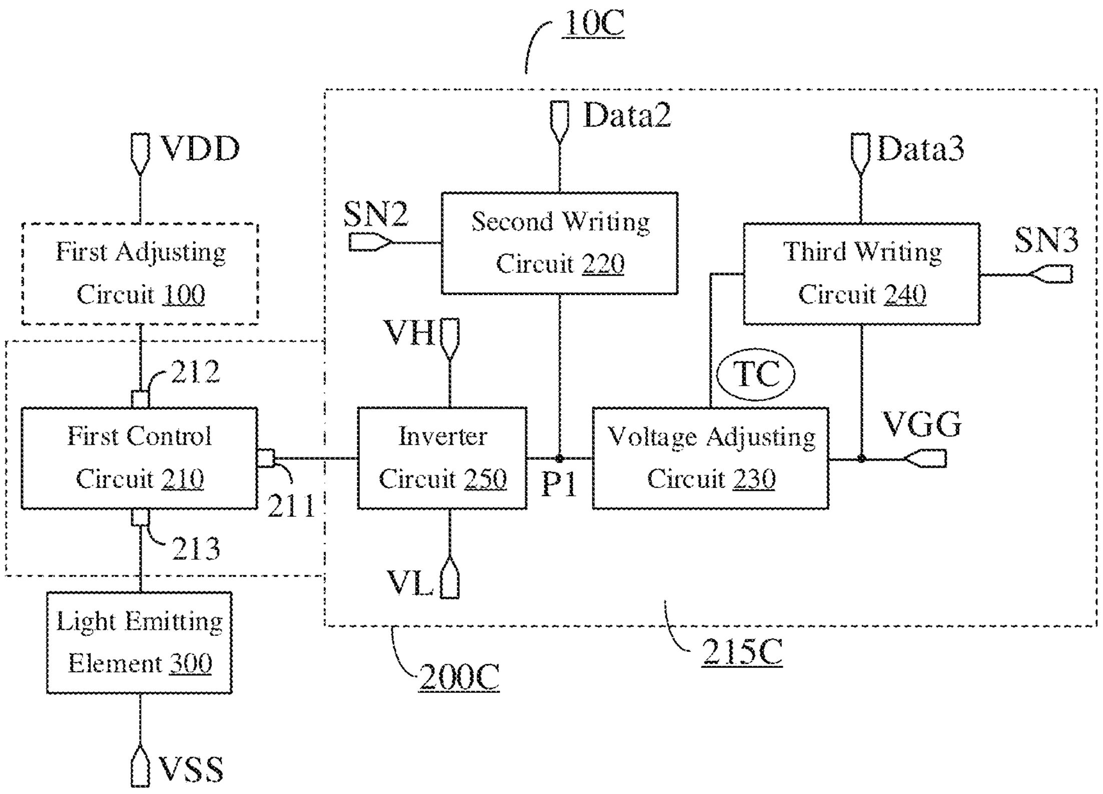
FIG. 8 is a schematic block diagram of still another example of the pixel circuit shown in FIG. 4.

FIG. 8 is a schematic block diagram of still another example of the pixel circuit shown in FIG. 4. As shown in FIG. 8, on the basis of the pixel circuit 10 shown in FIG. 5, a second control circuit 215C in a second adjusting circuit 200C of the pixel circuit 10C further includes a third writing circuit 240 and an inverter circuit 250. It should be noted that, other circuit structures of the pixel circuit 10C shown in FIG. 8 are substantially the same as those of the pixel circuit 10 shown in FIG. 5, and details will not be repeated here. It should also be noted that, for clarity and conciseness, the specific circuit structure of the first adjusting circuit 100 is omitted in the pixel circuit 10C shown in FIG. 8 (the first adjusting circuit 100 in the pixel circuit 10 shown in FIG. 5 can be referred to).

Of course, the pixel circuit 10C shown in FIG. 8 can also be understood as that: on the basis of the pixel circuit 10A shown in FIG. 6, the pixel circuit 10C further includes the inverter circuit 250; or, on the basis of the pixel circuit 10B shown in FIG. 7, the pixel circuit 10C further includes the third writing circuit 240. For example, the connection manner and operation principle of the third writing circuit 240 in the pixel circuit 10C shown in FIG. 8 can be referred to the related description of the pixel circuit 10A shown in FIG. 6; and the connection manner and operation principle of the inverter circuit 250 in the pixel circuit 10C shown in FIG. 8 can be referred to the related description of the pixel circuit 10B shown in FIG. 7.

It should be noted that, the first scan signal SN1, the second scan signal SN2, and the third scan signal SN3 in the embodiments of the present disclosure are intended to distinguish three control signals (e.g., scan signals) with different timing sequences. For example, the first scan signal SN1 is at an active level in the data writing and compensation stage, the second scan signal SN2 is at an active level in the time switch preset stage, and the third scan signal SN3 is at an active level in the light emitting stage. It should be noted that, with respect to the pixel circuit provided by the embodiments of the present disclosure, an "active level" refers to an electric level that can cause an operated transistor included by the pixel circuit to be turned on, and accordingly, an "inactive level" refers to an electric level that cannot cause an operated transistor included by the pixel circuit to be turned on (that is, the transistor is turned off). Depending on a type (N-type or P-type) of the transistor in the circuit structure of the pixel circuit, the active level can be higher or lower than the inactive level. For example, in the embodiments of the present disclosure, in the case where the transistor is a P-type transistor, the active level is a low level and the inactive level is a high level.

It should be noted that, in the pixel circuit provided by the embodiments of the present disclosure, the first data signal Data1 and the second data signal Data2 are provided to the pixel circuit (respectively provided to the first writing circuit 120 and the second writing circuit 220) in the data writing and compensation stage and in the time switch preset stage, respectively, and thus, the second writing circuit 220 and the first adjusting circuit 100 (the first writing circuit 120 in the first adjusting circuit 100) can be respectively connected with a same data signal terminal. The same data signal terminal is configured to provide corresponding data signals to the second writing circuit 220 and the first adjusting circuit 100 (the first writing circuit 120 in the first adjusting circuit 100) in different time periods, respectively, that is, the same data signal terminal can provide different data signals in a time-divisional manner. For example, the same data signal terminal can provide the first data signal Data1 in the data writing and compensation stage, and provide the second data signal Data2 in the time switch preset stage. In the case where the pixel circuit includes the third writing circuit, the third data signal Data3 is provides to the third writing circuit 240 of the pixel circuit in the light emitting stage, so the third data signal can also be provided by the same data signal terminal as described above. For example, the third writing circuit 240 is also connected with the same data signal terminal, and the same data signal terminal provides the third data signal Data3 in the light emitting stage. It should be noted that, whether the first data signal Data1, the second data signal Data2, and the third data signal Data3 are provided by the same data signal terminal is not be limited in the embodiments of the present disclosure.

Figure 9:
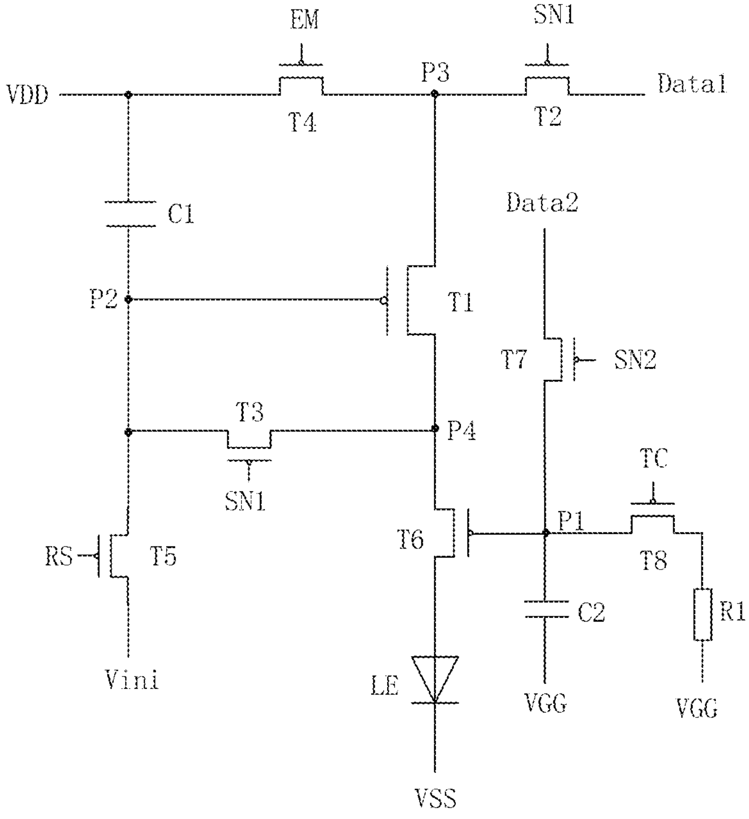
FIG. 9 is a schematic diagram of a circuit structure of a specific implementation example of the pixel circuit shown in FIG. 5.

FIG. 9 is a schematic diagram of a circuit structure of a specific implementation example of the pixel circuit 10 shown in FIG. 5. As shown in FIG. 9, the pixel circuit includes: a driving transistor T1, a first writing transistor T2, a compensation transistor T3, a light emitting control transistor T4, a reset transistor T5, a control transistor T6, a second writing transistor T7, a voltage adjusting transistor T8, a first storage capacitor C1 and a second storage capacitor C2. For example, FIG. 9 also shows a light emitting element LE (i.e., the light emitting element 300 described above). For example, the light emitting element can be a μLED (e.g., a micro LED), and the embodiments of the present disclosure include but are not limited thereto. Hereinafter, the embodiments are all described by taking the μLED as an example, which will not be repeated. The μLED can be of various types, for example, top emission, bottom emission, etc., and can emit red light, green light, blue light, or white light, etc., without being limited in the embodiments of the present disclosure. In addition, it should also be noted that, the embodiments below are described by taking respective transistors as P-type transistors (unless otherwise defined), but this case does not constitute a limitation to the embodiments of the present disclosure.

For example, as shown in FIG. 9, the driving circuit 110 can be implemented as the driving transistor T1. A gate electrode of the driving transistor T1 serves as the second control terminal 111 of the driving circuit 110 and is connected with a second node P2, a first electrode of the driving transistor T1 serves as the third terminal 112 of the driving circuit 110 and is connected with a third node P3, and a second electrode of the driving transistor T1 serves as the fourth terminal 113 of the driving circuit 110 and is connected with a fourth node P4.

For example, as shown in FIG. 9, the first writing circuit 120 can be implemented as the first writing transistor T2. A gate electrode of the first writing transistor T2 is connected with the first scan signal terminal to receive the first scan signal SN1, a first electrode of the first writing transistor T2 is connected with the first data signal terminal to receive the first data signal Data1, and a second electrode of the first writing transistor T2 is connected with the third node P3.

For example, as shown in FIG. 9, the compensation circuit 130 can be implemented as the compensation transistor T3 and the first storage capacitor C1. A gate electrode of the compensation transistor T3 is connected with the first scan signal terminal to receive the first scan signal SN1, a first electrode of the compensation transistor T3 is connected with the fourth node P4, a second electrode of the compensation transistor T3 is connected with the second node P2, a first terminal of the first storage capacitor C1 is connected with the second node P2, and a second terminal of the first storage capacitor C1 is connected with a second power terminal to receive a second power voltage VDD.

For example, as shown in FIG. 9, the light emitting control circuit 140 can be implemented as the light emitting control transistor T4. A gate electrode of the light emitting control transistor T4 is connected with a light emitting control signal terminal to receive the light emitting control signal EM, a first electrode of the light emitting control transistor T4 is connected with the second power terminal to receive the second power voltage VDD, and a second electrode of the light emitting control transistor T4 is connected with the third node P3. For example, the second power voltage VDD is a drive voltage, such as a high voltage.

For example, as shown in FIG. 9, the reset circuit 150 can be implemented as the reset transistor T5. Agate electrode of the reset transistor T5 is connected with a reset signal terminal to receive the reset signal RS, a first electrode of the reset transistor T5 is connected with a reset voltage terminal to receive the reset voltage Vini, and a second electrode of the reset transistor T5 is connected with the second node P2. For example, the reset voltage Vini can be a zero voltage or a ground voltage, or can also be any other fixed voltage, for example, a low voltage, etc., without being limited in the embodiment of the present disclosure.

For example, as shown in FIG. 9, the first control circuit 210 can be implemented as the control transistor T6. A gate electrode of the control transistor T6 serves as the first control terminal 211 of the first control circuit 210 and is electrically connected with the second control circuit 215 (e.g., as shown in FIG. 9, the gate electrode of the control transistor T6 is connected with the first node P1, and the second control circuit 215 is also connected with the first node P1), a first electrode of the control transistor T6 serves as the first terminal 212 of the first control circuit 210 and is connected with the fourth node P4, and a second electrode of the control transistor T6 serves as the second terminal 213 of the first control circuit 210 and is connected with a first electrode (e.g., an anode) of the light emitting element LE; and a second electrode (e.g., an cathode) of the light emitting element LE is connected with a third power terminal to receive a third power voltage VSS. For example, the third power voltage VSS can be a low voltage, and for example, the third power terminal can be grounded, so that the third power voltage VSS can be a zero voltage.

For example, as shown in FIG. 9, the second writing circuit 220 can be implemented as the second writing transistor T7. A gate electrode of the second writing transistor T7 is connected with a second scan signal terminal to receive the second scan signal SN2, a first electrode of the second writing transistor T7 is connected with a second data signal terminal to receive the second data signal Data2, and a second electrode of the second writing transistor T7 is connected with the first node P1.

For example, as shown in FIG. 9, the voltage adjusting circuit 230 can be implemented as the voltage adjusting transistor T8 and the second storage capacitor C2. Agate electrode of the voltage adjusting transistor T8 is connected with a time control signal terminal to receive the time control signal TC, a first electrode of the voltage adjusting transistor T8 is connected with the first power terminal to receive the first power voltage VGG, a second electrode of the voltage adjusting transistor T8 is connected with the first node P1, a first terminal of the second storage capacitor C2 is connected with the first node P1, and a second terminal of the second storage capacitor C2 is connected with the first power terminal to receive the first power voltage VGG. For example, in the pixel circuit shown in FIG. 9, the first power voltage VGG can cause the control transistor T6 to be turned off, and for example, the first power voltage VGG is a high voltage.

For example, as shown in FIG. 9, the voltage adjusting circuit 230 can further include a time control resistor R1 (not shown in FIG. 5). The first electrode of the voltage adjusting transistor T8 is connected with the first power terminal through the time control resistor R1. For example, the time control resistor R1 can be used to slow down a charging/discharging speed of the second storage capacitor C2, thereby prolonging the time duration in which the driving current is applied to the light emitting element LE, so as to facilitate controlling the time duration in which the driving current is applied to the light emitting element LE.

For example, with respect to the pixel circuit shown in FIG. 9, the first data signal terminal and the second data signal terminal can be a same data signal terminal. For example, the same data signal terminal can provide the first data signal Data1 and the second data signal Data2 in a time-divisional manner. For example, the same data signal terminal can provide the first data signal Data1 in the data writing and compensation stage, and provide the second data signal Data2 in the time switch preset stage. It should be noted that, the embodiments of the present disclosure are not limited to this case.

Figure 10:
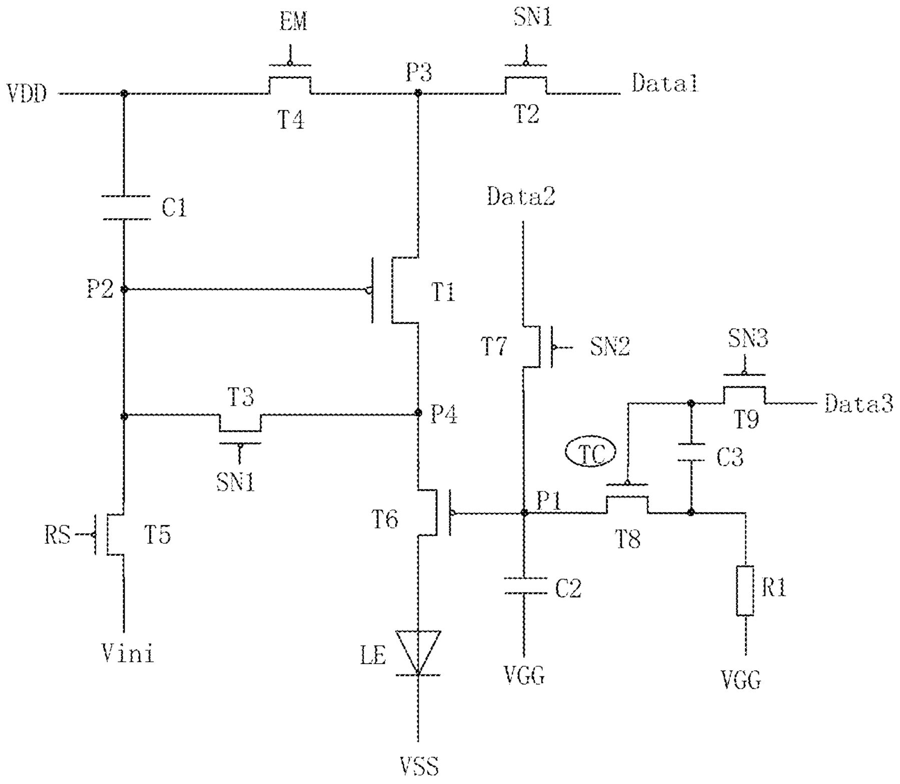
FIG. 10 is a schematic diagram of a circuit structure of a specific implementation example of the pixel circuit shown in FIG. 6.

FIG. 10 is a schematic diagram of a circuit structure of a specific implementation example of the pixel circuit 10A shown in FIG. 6. As shown in FIG. 10, on the basis of the pixel circuit shown in FIG. 9, the pixel circuit further includes a third writing transistor T9 and a third storage capacitor C3 for implementing the third writing circuit 240. It should be noted that, other circuit structures of the pixel circuit shown in FIG. 10 are substantially the same as those of the pixel circuit shown in FIG. 9, and details will not be repeated here.

For example, as shown in FIG. 10, a gate electrode of the third writing transistor T9 is connected with a third scan signal terminal to receive the third scan signal SN3, a first electrode of the third writing transistor T9 is connected with a third data signal terminal to receive the third data signal Data3, a second electrode of the third writing transistor T9 is connected with the gate electrode of the voltage adjusting transistor T8, a first terminal of the third storage capacitor C3 is connected with the gate electrode of the voltage adjusting transistor T8, and a second terminal of the third storage capacitor C3 is connected with the first electrode of the voltage adjusting transistor T8. For example, in the light emitting stage, the third writing transistor T9 is turned on in response to the third scan signal SN3, so that the third data signal Data3 can be written into the control terminal of the voltage adjusting transistor T8 as the time control signal TC.

For example, with respect to the pixel circuit shown in FIG. 10, the third data signal terminal can also be a same data signal terminal as the first data signal terminal and/or the second data signal terminal, and for example, the same data signal terminal can provide the first data signal Data1 and/or the second data signal Data2 as well as the third data signal Data3 in a time-divisional manner. For example, the same data signal terminal can provide the first data signal Data1 in the data writing and compensation stage, provide the second data signal Data2 in the time switch preset stage, and provide the third data signal Data3 in the light emitting stage. It should be noted that, the embodiments of the present disclosure are not limited to this case.

Figure 11:
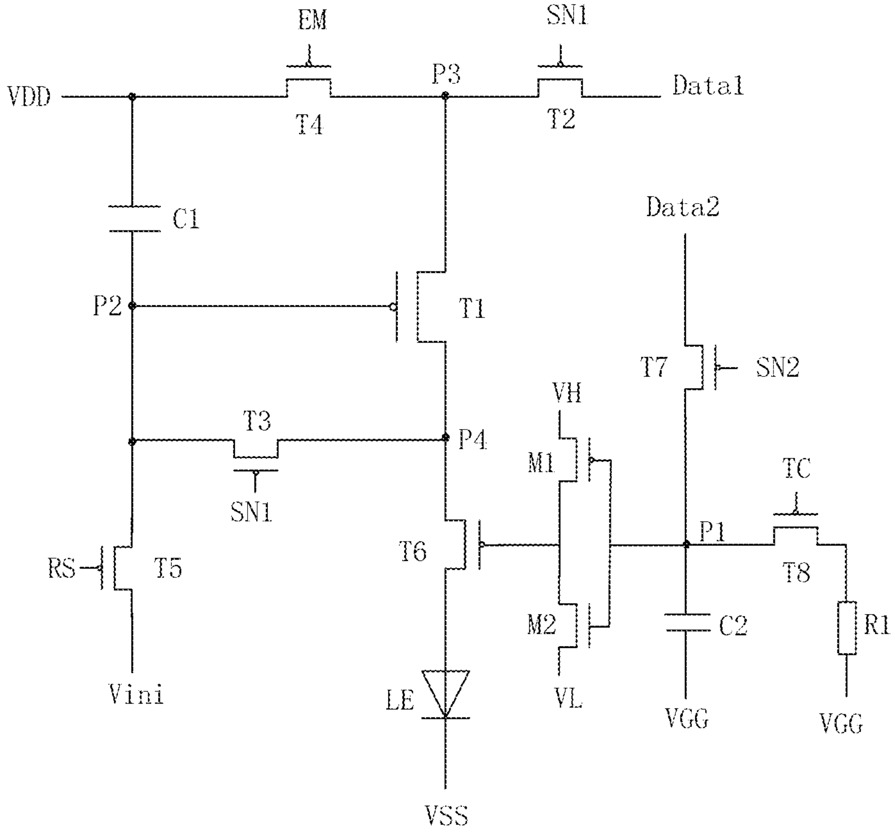
FIG. 11 is a schematic diagram of a circuit structure of a specific implementation example of the pixel circuit shown in FIG. 7.

FIG. 11 is a schematic diagram of a circuit structure of a specific implementation example of the pixel circuit 10B shown in FIG. 7. As shown in FIG. 11, on the basis of the pixel circuit shown in FIG. 9, the pixel circuit further includes a first transistor M1 and a second transistor M2 for implementing the inverter circuit 250. It should be noted that, other circuit structures of the pixel circuit shown in FIG. 11 are substantially the same as those of the pixel circuit shown in FIG. 9, and details will not be repeated here.

For example, as shown in FIG. 11, the type of the first transistor M1 is different from the type of the second transistor M2. For example, the first transistor M1 is a P-type transistor, and the second transistor M2 is an N-type transistor. It should be understood that, in some other examples, the first transistor M1 can be an N-type transistor, and the second transistor M2 can be a P-type transistor. A gate electrode of the first transistor M1 and a gate electrode of the second transistor M2 are connected with each other and serve as the input end of the inverter circuit 250 to be connected with the first node P1, a second electrode of the first transistor M1 and a second electrode of the second transistor M2 are connected with each other and serve as the output end of the inverter circuit 250 to be connected with the gate electrode of the control transistor T6 (i.e., the first control terminal 211 of the first control circuit 210), a first electrode of the first transistor M1 is connected with a first voltage terminal to receive a first voltage VH, a first electrode of the second transistor M2 is connected with a second voltage terminal to receive a second voltage VL. For example, the first voltage VH is different from the second voltage VL, and for example, the first voltage VH is a high level, and the second voltage VL is a low level. For example, in the case where the input end of the inverter circuit 250 is at a low level, the first transistor M1 is turned on, and the second transistor M2 is turned off, so that the output end of the inverter circuit 250 outputs a high level VH; and in the case where the input end of the inverter circuit 250 is at a high level, the first transistor M1 is turned off, and the second transistor M2 is turned on, so that the output end of the inverter circuit 250 outputs a low level VL. That is to say, the inverter circuit 250 can generate an output signal having a phase inverse to that of the input signal according to the input signal received by the input end thereof.

It should be noted that, the implementation manner of the inverter circuit 250 in the pixel circuit shown in FIG. 11 is illustrative, and the inverter circuit 250 can also adopt any other common implementation manner, without being limited in the embodiments of the present disclosure.

Figure 12:
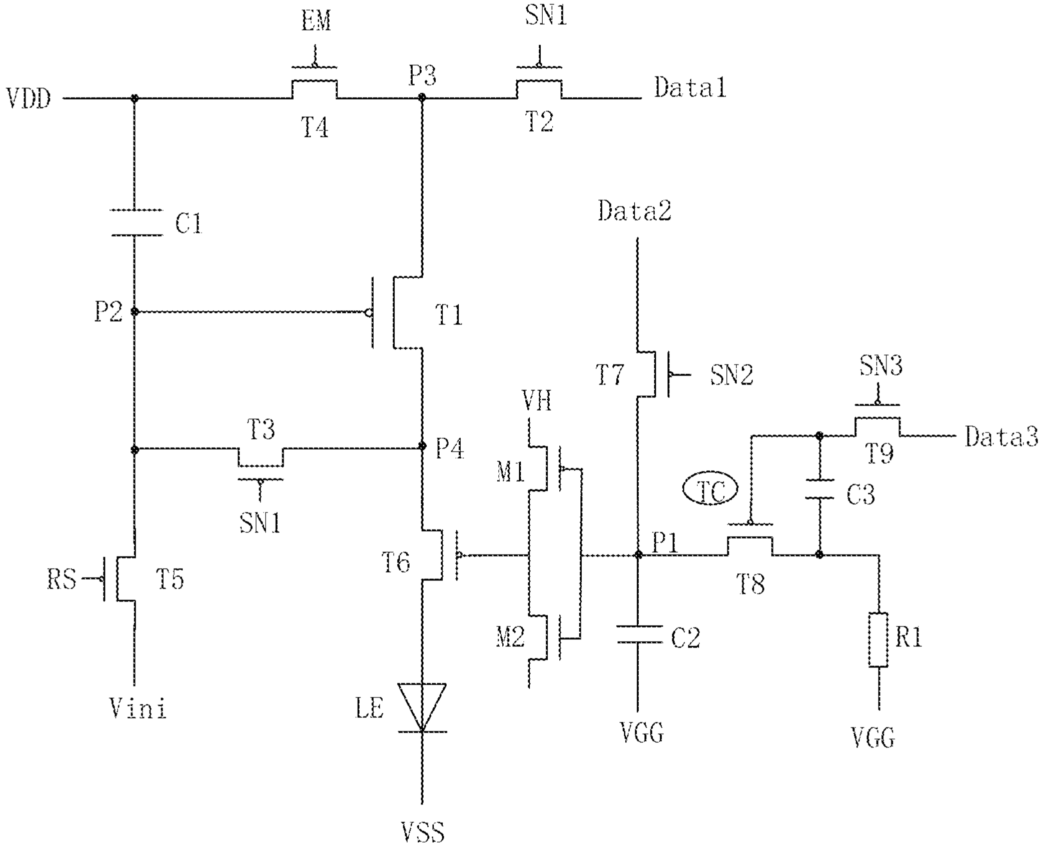
FIG. 12 is a schematic diagram of a circuit structure of a specific implementation example of the pixel circuit shown in FIG. 8.

FIG. 12 is a schematic diagram of a circuit structure of a specific implementation example of the pixel circuit 10C shown in FIG. 8. As shown in FIG. 12, on the basis of the pixel circuit shown in FIG. 9, the pixel circuit further includes a third writing transistor T9 and a third storage capacitor C3 for implementing the third writing circuit 240, as well as a first transistor M1 and a second transistor M2 for implementing the inverter circuit 250. It should be noted that, other circuit structures of the pixel circuit shown in FIG. 12 are substantially the same as those of the pixel circuit shown in FIG. 9, and details will not be repeated here.

Of course, the pixel circuit shown in FIG. 12 can also be understood as that: on the basis of the pixel circuit shown in FIG. 10, the pixel circuit further includes the first transistor M1 and the second transistor M2 for implementing the inverter circuit 250; or, on the basis of the pixel circuit shown in FIG. 11, the pixel circuit further includes the third writing transistor T9 and the third storage capacitor C3 for implementing the third writing circuit 240. For example, the connection manners and operation principles of the third writing transistor T9 and the third storage capacitor C3 for implementing the third writing circuit 240 in the pixel circuit shown in FIG. 12 can be referred to the related description of the pixel circuit shown in FIG. 10, and the connection manners and operation principles of the first transistor M1 and the second transistor M2 for implementing the inverter circuit 250 in the pixel circuit shown in FIG. 12 can be referred to the related description in the pixel circuit shown in FIG. 11; and details will not be repeated here.

It should be noted that, the pixel circuits shown in FIGS. 9-12 all include the time control resistor R1, but the embodiments of the present disclosure are not limited to this case. That is, the pixel circuits shown in FIG. 9 to FIG. 12 may not include the time control resistor R1.

It should be noted that, in the embodiments of the present disclosure, the storage capacitors (the first storage capacitor C1, the second storage capacitor C2, and the third storage capacitor C3) can be capacitor devices manufactured by technique processes, for example, a capacitor device is implemented by manufacturing specific capacitor electrodes; each electrode of the capacitor can be implemented by a metal layer, a semiconductor layer (e.g., doped polysilicon), etc.; and the capacitor can also be a parasitic capacitance between respective devices, and can be implemented by a transistor itself and other device and circuit. Connection manners of the capacitors are not limited to the manners as described above, and can also be other suitable connection manners as long as the electric level of the corresponding nodes can be stored.

It should be noted that, in the description of the embodiments of the present disclosure, the first node P1, the second node P2, the third node P3, and the fourth node P4 do not represent components that must actually exist, but represent junction points of related electrical connections in the circuit diagram.

It should be noted that, all the transistors used in the embodiments of the present disclosure can be thin-film transistors, field effect transistors, or other switching devices having the same characteristics; and all the embodiments of the present disclosure are described by taking the thin-film transistors as an example. The source electrode and the drain electrode of a transistor used here can be symmetrical in structure, so the source electrode and the drain electrode thereof can be structurally indistinguishable. In the embodiments of the present disclosure, in order to distinguish the two electrodes of the transistor other than the gate electrode, one of the electrodes is directly described as a first electrode and the other electrode as a second electrode.

In addition, the transistors in the embodiments of the present disclosure are mainly described by taking P-type transistors as an example (the inverter circuit includes both a P-type transistor and an N-type transistors), and in this case, the first electrode of the transistor is a source electrode, the second electrode is a drain electrode. It should be noted that, the present disclosure includes but is not limited thereto. For example, one or a plurality of transistors in the pixel circuit 10 provided by the embodiments of the present disclosure can also be N-type transistors, and in this case, with respect to each transistor, the first electrode is a drain electrode, and the second electrode is a source electrode. It is only necessary to connect respective electrodes of the transistor of a selected type with reference to the respective electrodes of the corresponding transistor according to the embodiments of the present disclosure, and to cause the corresponding voltage terminals to provide a high voltage or a low voltage corresponding thereto. In the case where an N-type transistor is used, indium gallium zinc oxide (IGZO) can be used as an active layer of the thin-film transistor, which can effectively reduce the size of the transistor and avoid a leakage current as compared with the case in which low-temperature poly-silicon (LTPS) or amorphous silicon (e.g., hydrogenated amorphous silicon) is used as the active layer of the thin-film transistor.

It should be noted that, the embodiments of the present disclosure are described by taking that the cathode of the light emitting element LE is applied with the third power voltage VSS (a low voltage) as an example; and the embodiments of the present disclosure include but are not limited thereto. For example, the anode of the light emitting element LE can be applied with the second power voltage VDD (a high voltage), and the cathode thereof is directly or indirectly coupled to the driving circuit. For example, the 2T1C pixel circuit shown in FIG. 3B can be referred to.

At least one embodiment of the present disclosure further provides a driving method corresponding to the pixel circuit provided by any one of the embodiments described above. For example, the driving method includes: causing the first adjusting circuit 100 to receive the first data signal Data1 and the light emitting control signal EM, and controlling the magnitude of the driving current for driving the light emitting element 300; and causing the second adjusting circuit 200 to receive the second data signal Data2 and the time control signal TC to control the time duration in which the driving current is applied to the light emitting element 300. For example, the time control signal TC changes within a time period during which the light emitting control signal allows the driving current to be generated, and for example, the change of the time control signal TC can control the length of the light emitting time of the light emitting element 300.

For example, in some embodiments, referring to FIGS. 5-8, the second adjusting circuit includes a first control circuit 210 and a second control circuit 215. The first control circuit 210 includes a first control terminal 211, a first terminal 212, and a second terminal 213; and the second control circuit 215 is configured to control an electric level of the first control terminal 211 of the first control circuit 210 based on the second data signal Data2 and the time control signal TC, so as to control a time duration in which the driving current flows through the first terminal 212 and the second terminal 213 of the first control circuit 210. In this case, the driving method described above includes a light emitting stage: in the light emitting stage, cause the second control circuit 215 to control the electric level of the first control terminal 211 of the first control circuit 210 based on the second data signal Data2 and the time control signal TC, so as to change the first control circuit 210 from an on state to an off state, so that the time duration in which the driving current flows through the first terminal 212 and the second terminal 213 of the first control circuit 210.

Figure 13:
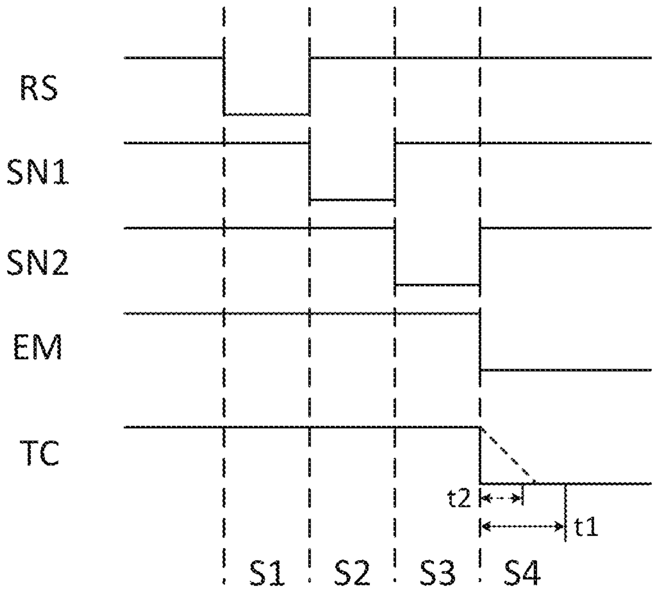
FIG. 13 is a signal timing chart of a driving method of a pixel circuit provided by at least one embodiment of the present disclosure.

FIG. 13 is a signal timing chart of a driving method of a pixel circuit provided by at least one embodiment of the present disclosure. Hereinafter, an operation principle of the pixel circuit shown in FIG. 5 will be described with reference to the signal timing chart shown in FIG. 13 and by taking that the pixel circuit shown in FIG. 5 is specifically implemented as the pixel circuit structure shown in FIG. 9 as an example. It should be noted that, a potential level in the signal timing chart shown in FIG. 13 is merely illustrative, and does not represent a true potential value or a relative proportion. In the pixel circuit shown in FIG. 9, a low-level signal corresponds to an on signal of the P-type transistor, and a high-level signal corresponds to an off signal of the P-type transistor.

FIGS. 14A-14D are schematic circuit diagrams of the pixel circuit shown in FIG. 9 corresponding to four stages in FIG. 13, respectively. Hereinafter, the operation principle of the pixel circuit will be described in detail with reference to FIGS. 14A-14D and by taking the pixel circuit shown in FIG. 9 as an example.

For example, as shown in FIG. 13, the driving method provided by the present embodiment can include four stages of displaying one frame of picture, namely an initialization stage S1, a data writing and compensation stage S2, a time switch preset stage S3, and a light emitting stage S4; and FIG. 13 shows timing waveforms of respective control signals (the reset signal RS, the first scan signal SN1, the second scan signal SN2, the light emitting control signal EM, and the time control signal TC) in each stage.

Figure 14A:
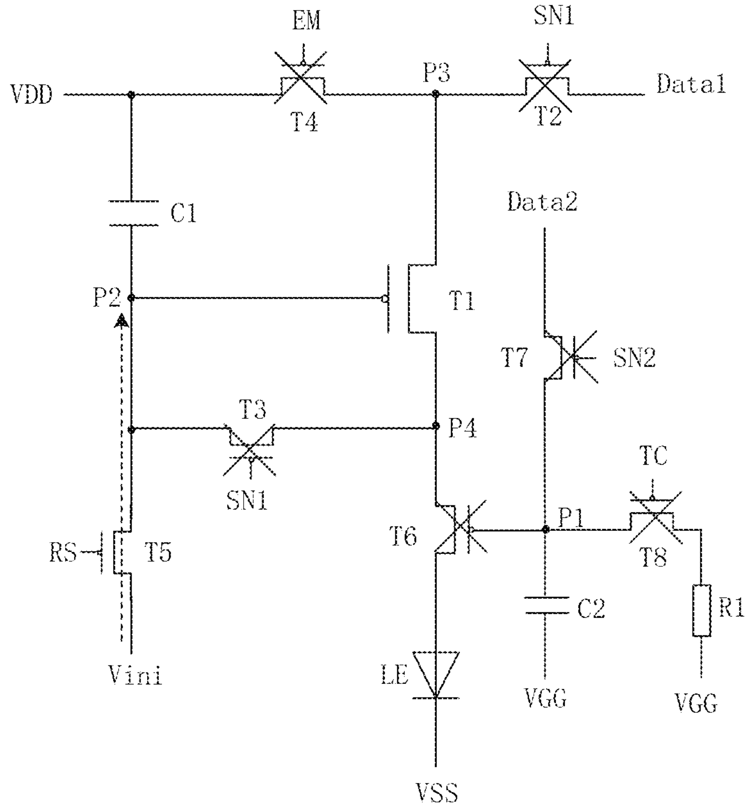
FIG. 14A-14D are schematic circuit diagrams of the pixel circuit shown in FIG. 9 corresponding to four stages in FIG. 13, respectively.
Figure 14B:
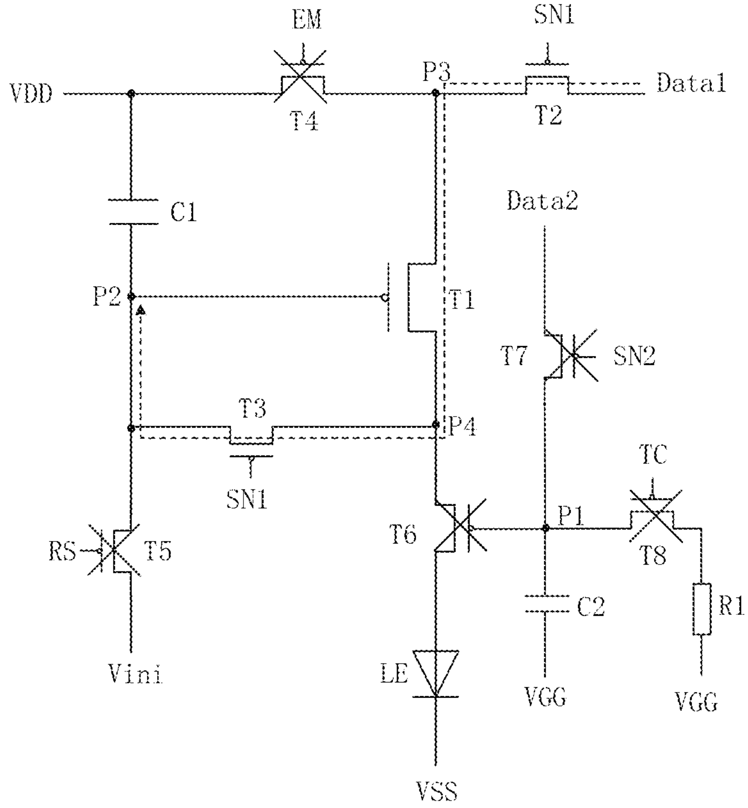
Figure 14C:
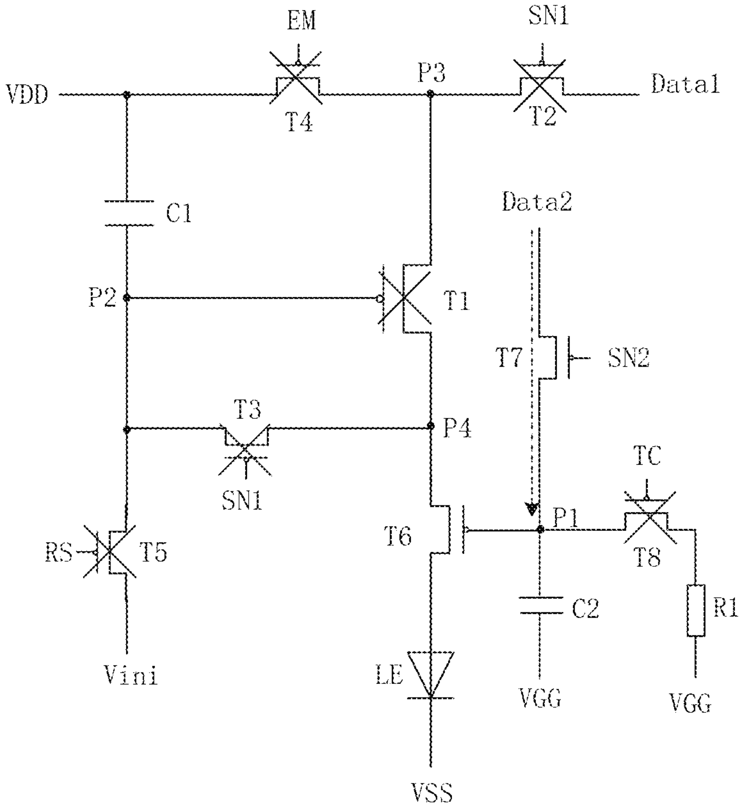
Figure 14D:
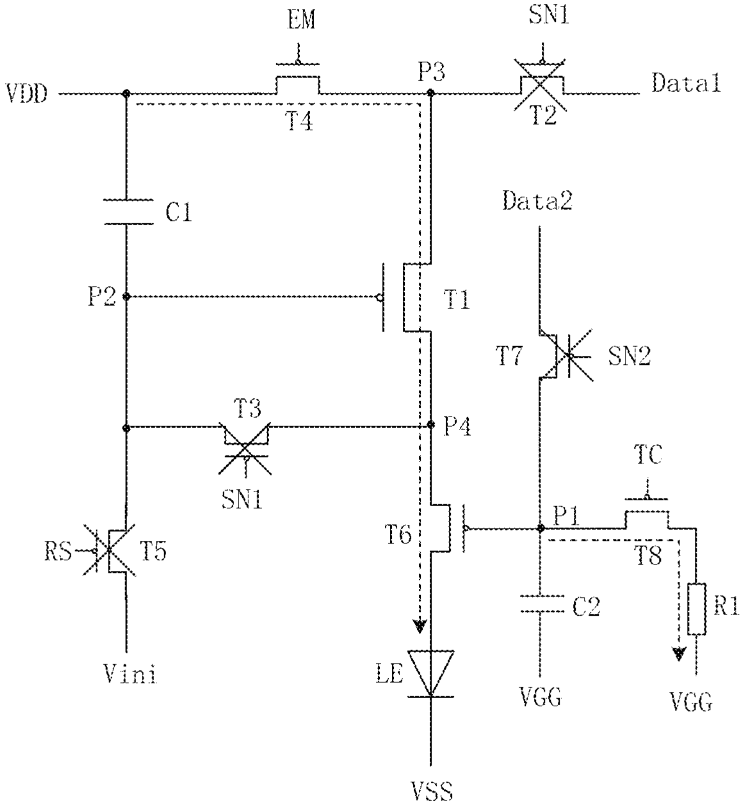

It should be noted that, FIG. 14A is a schematic circuit diagram when the pixel circuit shown in FIG. 9 is in the initialization stage S1, FIG. 14B is a schematic circuit diagram when the pixel circuit shown in FIG. 9 is in the data writing and compensation stage S2, FIG. 14C is a schematic circuit diagram when the pixel circuit shown in FIG. 9 is in the time switch preset stage S3, and FIG. 14D is a schematic circuit diagram when the pixel circuit shown in FIG. 9 is in the light emitting stage S4. In addition, a transistor marked by a cross (X) in FIGS. 14A-14D indicates that the transistor is in an off state in a corresponding stage, and a dashed line with an arrow in FIGS. 14A-14D indicates a current path of the pixel circuit in a corresponding stage (the direction of the arrow does not represent a current direction). All the transistors shown in FIGS. 14A-14D take P-type transistors as an example, that is, each transistor is turned on when the gate electrode of is applied with a low level, and is turned off when the gate electrode of is applied with a high level.

In the initialization stage S1, the reset signal RS is input to turn on (i.e., conduct) the reset circuit 150, and the reset voltage Vini is applied to the second control terminal 111 of the driving circuit 110 through the reset circuit 150, so as to reset the second control terminal 111 of the driving circuit 110.

As shown in FIG. 13 and FIG. 14A, in the initialization stage S1, the reset transistor T5 is turned on by the low level of the reset signal RS; meanwhile, the first writing transistor T2 and the compensation transistor T3 are turned off by the high level of the first scan signal SN1, the light emitting control transistor T4 is turned off by the high level of the light emitting control signal EM, the second writing transistor T7 is turned off by the high level of the second scan signal SN2, the voltage adjusting transistor T8 is turned off by the high level of the time control signal TC, and the control transistor T6 is turned off by the high level of the first node P1 (during the process of displaying a previous frame, the second storage capacitor C2 will be charged/discharged, so that the electric level of the first node P1 becomes the high level VGG).

As shown in FIG. 14A, in the initialization stage S1, an initialization path (as indicated by a dashed line with an arrow in FIG. 14A) can be formed. Because the reset voltage Vini is a low voltage (e.g., which may be a ground voltage or other low voltage), the first storage capacitor C1 is charged/discharged through the initialization path (i.e., the reset transistor T5), so that a potential of the first terminal of the first storage capacitor C1 and the gate electrode of the driving transistor T1 (i.e., the second node P2) becomes Vini. And thus, a display apparatus adopting the above-described pixel circuit resets the driving circuit 110 each time the picture is switched. The reset operation can inhibit the occurrence of short-term afterimages and other phenomena.

In the data writing and compensation stage S2, the first scan signal SN1 is input to turn on the first writing circuit 120 and the compensation circuit 130, the first data signal is written into the compensation circuit 130 through the first writing circuit 120 and the driving circuit 110, and the driving circuit 110 is compensated through the compensation circuit 130.

As shown in FIG. 13 and FIG. 14B, in the data writing and compensation stage S2, the first writing transistor T2 and the compensation transistor T3 are turned on by the low level of the first scan signal SN1, and at this moment, because the compensation transistor T3 is turned on, the driving transistor T1 enters a diode connection state (the gate electrode and the second electrode of the driving transistor T1 are connected with each other); meanwhile, the light emitting control transistor T4 is turned off by the high level of the light emitting control signal EM, the reset transistor T5 is turned off by the high level of the reset signal RS, the control transistor T6 is turned off by the high level of the first node P1, the second writing transistor T7 is turned off by the high level of the second scan signal SN2, and the voltage adjusting transistor T8 is turned off by the high level of the time control signal TC.

As shown in FIG. 14B, in the data writing and compensation stage S2, a data writing and compensation path (as indicated by a dashed line with an arrow in FIG. 14B) can be formed. The first terminal of the first storage capacitor C1 (i.e., the second node P2) is charged by the first data signal Data1 through the data writing and compensation path (i.e., the first writing transistor T2, the driving transistor T1, and the compensation transistor T3), so that a potential of the first terminal of the first storage capacitor C1 becomes Data1. Meanwhile, according to characteristics of the driving transistor T1 itself, when the potential of the first terminal of the first storage capacitor C1 increases to Data1+Vth, the driving transistor T1 is turned off, and the charging process ends. It should be noted that, Vth represents a threshold voltage of the driving transistor T1; and in the present embodiment, the driving transistor T1 is described by taking a P-type transistor as an example, so the threshold voltage Vth here can have a negative value.

After the data writing and compensation stage S2, the potential of the first terminal of the first storage capacitor C1 (i.e., the second node P2) is Data1+Vth, that is to say, voltage information carrying the first data signal Data1 and the threshold voltage Vth is stored in the first storage capacitor C1, so as to provide a grayscale display data and to compensate for the threshold voltage of the driving transistor T1 itself in the subsequent light emitting stage.

In the time switch preset stage S3, the second scan signal SN2 is input to turn on the second writing circuit 220, the second data signal Data2 is written into the voltage adjusting circuit 230 through the second writing circuit 220, and the first control circuit 210 is set to be in an on state.

As shown in FIG. 13 and FIG. 14C, in the time switch preset stage S3, the second writing transistor T7 is turned on by the low level of the second scan signal SN2; meanwhile, the first writing transistor T2 and the compensation transistor T3 are turned off by the high level of the first scan signal SN1, the light emitting control transistor T4 is turned off by the high level of the light emitting control signal EM, the reset transistor T5 is turned off by the high level of the reset signal RS, the control transistor T6 is turned off by the high level of the first node P1, the voltage adjusting transistor T8 is turned off by the high level of the time control signal TC, and the driving transistor T1 remains in an off state the same as that at the end of the data writing and compensating stage S2.

As shown in FIG. 14C, in the time switch preset stage S3, a second data writing path (as indicated by a dashed line with an arrow in FIG. 14C) can be formed. The first terminal of the second storage capacitor C2 (i.e., the first node P1) is discharged by the second data signal Data2 through the second data writing path (i.e., the second writing transistor T7), so that the potential of the first terminal of the second storage capacitor C2 becomes Data2. For example, the second data signal Data2 is at a low level that causes the control transistor T6 to be turned on, so that the control transistor T6 can be turned on before the beginning of the light emitting stage.

In the light emitting stage S4, the light emitting control signal EM and the time control signal TC are input, the light emitting control circuit 140, the driving circuit 110 and the voltage adjusting circuit 230 are turned on; a driving current is applied to the light emitting element 300 through the light emitting control circuit 140, the driving circuit 110 and the first control circuit 210 (which has already been turned on in the time switch preset stage S3), so as to cause the light emitting element 300 to emit light; and the first control circuit 210 is set from an on state to an off state by the voltage adjusting circuit 230 (within the light emitting stage S4, the on state of the first control circuit 210 is maintained for a period of time t, and the on-time duration t is shown as t1 or t2 in FIG. 13), so as to control the time duration in which the driving current is applied to the light emitting element 300 (i.e., the light emitting time of the light emitting element 300).

As shown in FIG. 13 and FIG. 14D, in the light emitting stage S4, the first writing transistor T2 and the compensation transistor T3 are turned off by the high level of the first scan signal SN1, the reset transistor T5 is turned off by the high level of the reset signal RS, the second writing transistor T7 is turned off by the high level of the second scan signal SN2, the light emitting control transistor T4 is turned on by the low level of the light emitting control signal EM; meanwhile, the potential of the second node P2 is Data1+Vth, the potential of the third node P3 is VDD, and thus, the driving transistor T1 remains in an on state in this stage; in addition, the control transistor T6 has already been turned on before the light emitting stage S4 starts (in the time switch preset stage S3).

As shown in FIG. 14D, in the light emitting stage S4, a drive light emitting path and a light emitting time control path (as indicated by dashed lines with an arrow in FIG. 14D, the dashed line on the left represents the drive light emitting path, and the dashed line on the right represents the light emitting time control path) can be formed. The first electrode (the anode) of the light emitting element LE is applied with the second power voltage VDD (a high voltage) through the drive light emitting path, and the second electrode (the cathode) of the light emitting element LE is applied with the third power voltage VSS (a low voltage), so that the light emitting element LE can emit light under the action of the driving current flowing through the driving transistor T1. The driving current generated by the driving transistor T1 can be obtained according to a formula as follows:

$$\begin{aligned} I_{LE} &= K(Vgs - Vth)^2 \\ &= K[(\text{Data1} + Vth - VDD) - Vth]^2 \\ &= K(\text{Data1} - VDD)^2 \end{aligned}$$

In the above formula, $I_{LE}$ represents the driving current, Vth represents the threshold voltage of the driving transistor T1, Vgs represents a voltage difference between the gate electrode and the first electrode (e.g., the source electrode) of the driving transistor T1, and K is a constant value. As can be seen from the above formula, the driving current $I_{LE}$ flowing through the light emitting element LE is not related to the threshold voltage Vth of the driving transistor T1 any longer, but only related to the data signal Data1 that controls a grayscale of light emitted by the pixel circuit, so that compensation to the pixel circuit can be realized, the problem of a threshold voltage drift of the driving transistor due to a technique process as well as long-term operation and use can be solved, and the influence of the problem on the driving current $I_{LE}$ can be eliminated, thereby improving a display effect.

The driving current $I_{LE}$ described above is applied to the light emitting element LE through the drive light emitting path, so that the light emitting element LE emits light under the action of the driving current flowing through the driving transistor T1. It should be noted that, in the pixel circuit provided by the embodiments of the present disclosure, the grayscale of light emitted by the pixel circuit is not only related to the magnitude of the driving current, but also related to the length of the time duration in which the driving current is applied to the light emitting element (i.e., the length of the light emitting time). For example, a relationship between the grayscale of light emitted by the pixel circuit and the magnitude of the driving current as well as the length of the light emitting time can be determined via theoretical calculations, simulations, experimental measurements, etc. Moreover, based on the relationship, a desired grayscale can be displayed by simultaneously controlling the magnitude of the driving current and the length of the light emitting time.

In the light emitting stage S4, the second storage capacitor C2 can be charged/discharged through the light emitting time control path (i.e., the voltage adjusting transistor T8), and the charging/discharging process will not end until the potential of the first terminal of the second storage capacitor C2 changes from Data2 to VGG. as the charging/discharging process of the second storage capacitor C2 continues, the electric level of the first node P1 changes from being able to turn on the control transistor T6 to being unable to turn on the control transistor T6, that is, the control transistor T6 will gradually change from an on state to an off state. For example, the time duration in which the on state of the control transistor T6 is maintained in the light emitting stage S4 (i.e., on-time duration) is t. The on-time duration t of the control transistor T6 is related to the charging/discharging speed of the second storage capacitor C2. For example, the faster the charging/discharging speed of the second storage capacitor C2 is, the shorter the on-time duration t of the control transistor T6 is.

For example, as shown in FIG. 13, in the case where the pixel circuit includes a time control resistor R1, the on-time duration t of the control transistor T6 is t1; and in the case where the pixel circuit does not include the time control resistor R1, the on-time duration t of the control transistor T6 is t2, where t2<t1. That is, the time control resistor R1 can slow down the charging/discharging speed of the second storage capacitor C2, thereby prolonging the time duration in which the driving current is applied to the light emitting element LE.

For example, as shown in FIG. 13, the charging/discharging speed of the second storage capacitor C2 can also be controlled by adjusting the waveform of the time control signal TC. For example, the time control signal TC can be adjusted from a square wave signal to a slow change signal (a changing part is shown by a slanted dashed line in FIG. 13), so that the time duration in which the driving current is applied to the light emitting element LE can be prolonged.

For example, in some embodiments, an on degree of the voltage adjusting transistor T8 can also be controlled by controlling the amplitude of the time control signal TC, so that the charging/discharging speed of the second storage capacitor C2 can be controlled, and further, the on-time duration t of the control transistor T6 can be adjusted.

It should be noted that, the adjusting manner of the on-time duration t of the control transistor T6 is not be limited in the embodiments of the present disclosure, that is, one or more of the above-described adjusting manners can be adopted.

It should be noted that, because the inverter circuit 250 can be regarded as a double-end (an input end and an output end) device, no additional control signal is required to control the inverter circuit 250. Therefore, the pixel circuit shown in FIG. 7 (e.g., specifically implemented as the pixel circuit structure shown in FIG. 11) can also be driven according to the timing chart of various control signals shown in FIG. 13, as long as polarities of the first power voltage VGG and the second data signal Data2 are changed correspondingly. For example, with respect to the pixel circuit shown in FIG. 9, the first power voltage VGG is at a high level that causes the control transistor T6 to be turned off, and the second data signal Data2 is at a low level that causes the control transistor T6 to be turned on; and with respect to the pixel circuit shown in FIG. 11, the first power voltage VGG is at a low level that causes the inverter circuit 250 to output a high level (the high level output by the inverter circuit 250 causes the control transistor T6 to be turned off), and the second data signal Data2 is at a high level that causes the inverter circuit 250 to output a low level (the low level output by the inverter circuit 250 causes the control transistor T6 to be turned on). It should be noted that, other aspects of the operation principle of the pixel circuit shown in FIG. 11 are substantially the same as those of the pixel circuit shown in FIG. 9, and details will not be repeated here.

Figure 15:
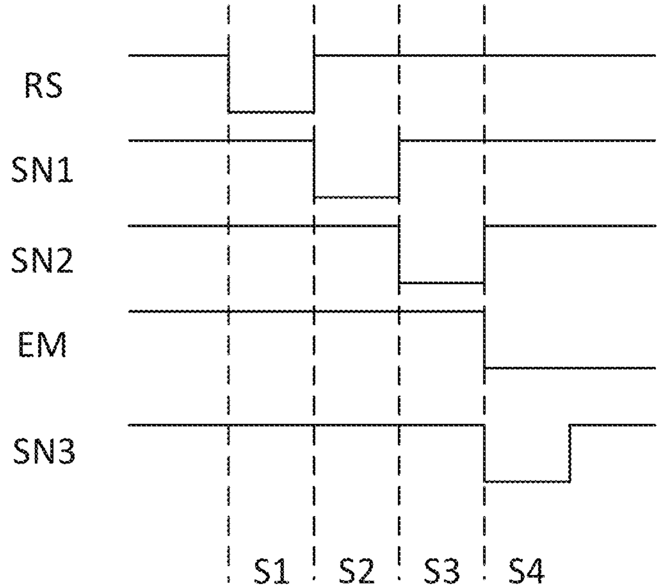
FIG. 15 is a signal timing chart of a driving method of another pixel circuit provided by at least one embodiment of the present disclosure.

FIG. 15 is a signal timing chart of a driving method of another pixel circuit provided by at least one embodiment of the present disclosure. Hereinafter, an operation principle of the pixel circuit shown in FIG. 6 will be described with reference to the signal timing chart shown in FIG. 15 and by taking that the pixel circuit shown in FIG. 6 is specifically implemented as the pixel circuit structure shown in FIG. 10 as an example. It should be noted that, a potential level in the signal timing chart shown in FIG. 15 is merely illustrative, and does not represent a true potential value or a relative proportion. In the pixel circuit shown in FIG. 10, a low-level signal corresponds to an on signal of the P-type transistor, and a high-level signal corresponds to an off signal of the P-type transistor.

The pixel circuit shown in FIG. 10 differs from the pixel circuit shown in FIG. 9 in that: the pixel circuit in FIG. 10 further includes the third writing transistor T9 and the third storage capacitor C3. Because the function of the third writing transistor T9 is to provide the time control signal TC (which function in the light emitting stage S4), and the third writing transistor T9 is turned on by the third scan signal SN3 only in the light emitting stage S4, the operation principle of the pixel circuit shown in FIG. 10 is substantially the same as the operation principle of the pixel circuit shown in FIG. 9 in the initialization stage S1, the data writing and compensation stage S2, and the time switch preset stage S3, and details will not be repeated here.

A main difference between the operation principle of the pixel circuit shown in FIG. 10 in the light emitting stage S4 and the operation principle of the pixel circuit shown in FIG. 9 in the light emitting stage S4 is that: in the pixel circuit shown in FIG. 9, the time control signal TC is directly provided to the voltage adjusting transistor T8; while in the pixel circuit shown in FIG. 10, the time control signal TC is indirectly provided to the voltage adjusting transistor T8 through the third writing transistor T9 and the third storage capacitor C3. Other aspects of the operation principle of the pixel circuit shown in FIG. 10 in the light emitting stage S4 are substantially the same as those of the pixel circuit shown in FIG. 9 in the light emitting stage S4, and details will not be repeated here.

Figure 16:
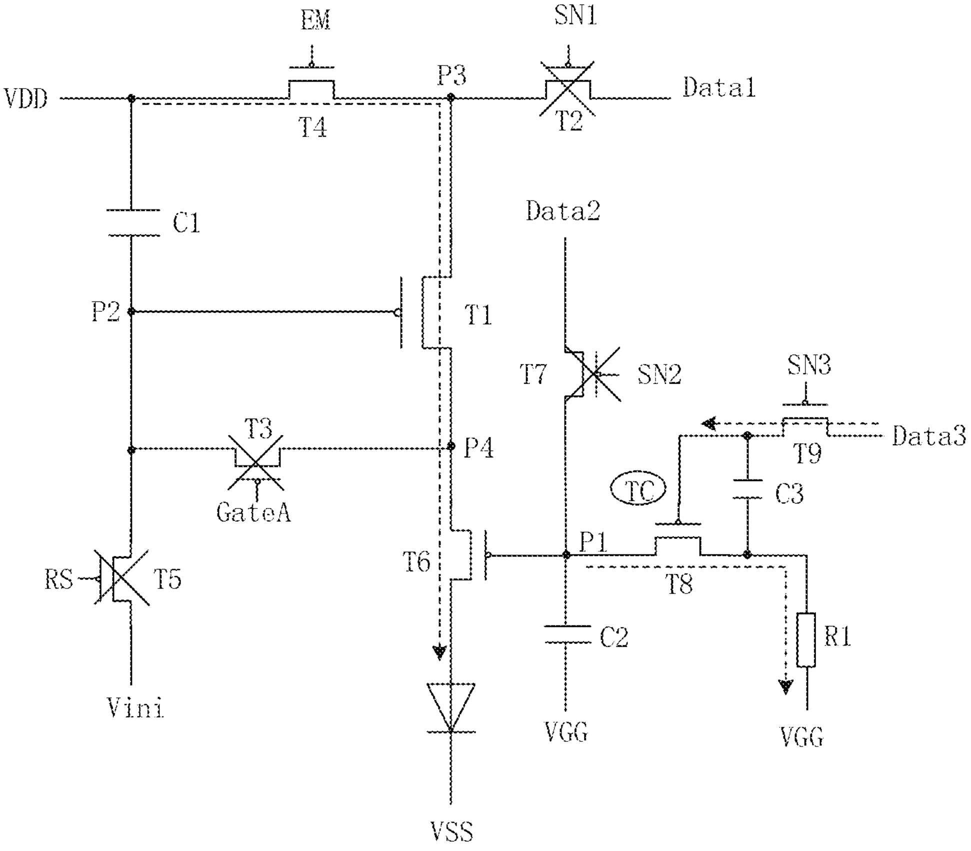
FIG. 16 is a schematic circuit diagram of the pixel circuit shown in FIG. 10 corresponding to a light emitting stage S4 in FIG. 15.

FIG. 16 is a schematic circuit diagram of the pixel circuit shown in FIG. 10 corresponding to a light emitting stage S4 in FIG. 15. A transistor marked by a cross (X) in FIG. 16 indicates that the transistor is in an off state in the light emitting stage, and a dashed line with an arrow in FIG. 16 indicates a current path of the pixel circuit in the light emitting stage (the direction of the arrow does not represent a current direction). All the transistors shown in FIG. 16 take P-type transistors as an example, that is, each transistor is turned on when the gate electrode of is applied with a low level, and is turned off when the gate electrode of is applied with a high level.

Hereinafter, the main difference between the operation principle of the pixel circuit shown in FIG. 10 in the light emitting stage S4 and the operation principle of the pixel circuit shown in FIG. 9 in the light emitting stage S4 will be described in detail with reference to FIG. 16 and by taking the pixel circuit shown in FIG. 10 as an example.

With respect to the pixel circuit shown in FIG. 10, in the light emitting stage S4, the third scan signal SN3 is input to turn on the third writing circuit 240, and the third data signal Data3 is written into the voltage adjusting circuit 230 through the third writing circuit 240 as the time control signal TC.

As shown in FIG. 15 and FIG. 16, in the light emitting stage S4, the third writing transistor T9 is turned on by the low level of the third scan signal SN3, so that a third data writing path (as indicated by a horizontal dashed line with an arrow in FIG. 16) can be formed. the first terminal of the third storage capacitor C3 is charged/discharged by the third data signal Data3 through the third data writing path (i.e., the third writing transistor T9), so that the potential of the first terminal of the third storage capacitor C3 becomes Data3. For example, in some examples, the third data signal Data3 stored by the third storage capacitor C3 can be used as the time control signal TC described above. For example, the third data signal Data3 is at a low level that causes the voltage adjusting transistor T8 to be turned on, and the third data signal Data3 stored by the third storage capacitor C3 can maintain the on state of the voltage adjusting transistor T8 in the light emitting stage S4. For example, the on degree of the voltage adjusting transistor T8 can be controlled by controlling the amplitude of the third data signal Data3, so as to control the charging/discharging speed of the second storage capacitor C2, and further, to adjust the on-time duration t of the control transistor T6.

It should be noted that, because the inverter circuit 250 can be regarded as a double-end (an input end and an output end) device, no additional control signal is required to control the inverter circuit 250. Therefore, the pixel circuit shown in FIG. 8 (e.g., specifically implemented as the pixel circuit structure shown in FIG. 12) can also be driven according to the timing chart of various control signals shown in FIG. 15, as long as polarities of the first power voltage VGG and the second data signal Data2 are changed correspondingly. For example, with respect to the pixel circuit shown in FIG. 10, the first power voltage VGG is at a high level that causes the control transistor T6 to be turned off, and the second data signal Data2 is at a low level that causes the control transistor T6 to be turned on; and with respect to the pixel circuit shown in FIG. 12, the first power voltage VGG is at a low level that causes the inverter circuit 250 to output a high level (the high level output by the inverter circuit 250 causes the control transistor T6 to be turned off), and the second data signal Data2 is at a high level that causes the inverter circuit 250 to output a low level (the low level output by the inverter circuit 250 causes the control transistor T6 to be turned on). It should be noted that, other aspects of the operation principle of the pixel circuit shown in FIG. 12 are substantially the same as those of the pixel circuit shown in FIG. 10, and details will not be repeated here.

Technical effects of the driving method of the pixel circuit provided by the embodiments of the present disclosure can be referred to the related description of the pixel circuit in the foregoing embodiments, and details will not be repeated here.

At least one embodiment of the present disclosure further provides an array substrate. The array substrate includes a plurality of pixel units arranged in an array, and each pixel unit includes the pixel circuit provided by any one of the above-described embodiments of the present disclosure, such as the pixel circuit shown in any one of FIGS. 5-12. For example, each pixel unit further includes the light emitting element involved in any one of the above-described embodiments of the present disclosure. For example, the light emitting element includes a micron-sized light emitting element, for example, a μLED, such as a micro LED, etc.; and it should be noted that, the embodiments of the present disclosure are not limited thereto.

Figure 17A:
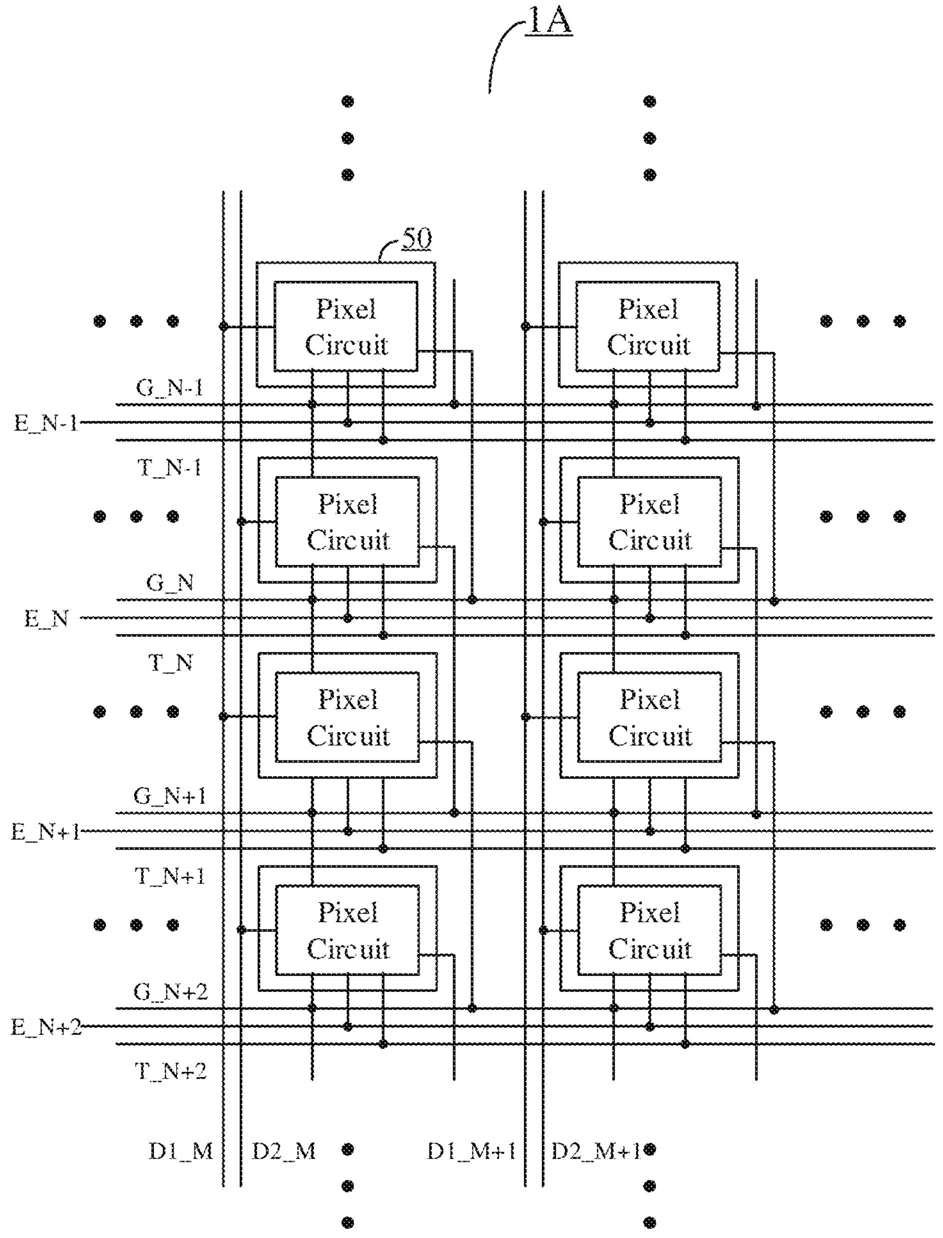
FIG. 17A is a schematic diagram of an array substrate provided by at least one embodiment of the present disclosure.

FIG. 17A is a schematic diagram of an array substrate provided by at least one embodiment of the present disclosure. As shown in FIG. 17A, the array substrate 1A includes a plurality of pixel units 50 arranged in an array, a plurality of scan signal lines, a plurality of light emitting control signal lines, a plurality of time control signal lines, and a plurality of data signal lines. For example, each pixel unit 50 includes the pixel circuit shown in FIG. 5 or FIG. 7, that is, the pixel circuit does not includes the third writing circuit 240. It should be noted that, only a part of the pixel units 50, the scan signal lines, the light emitting control signal lines, the time control signal lines, and the data signal lines are shown in FIG. 17A. For example, G_N−1, G_N, G_N+1 and G_N+2 represent the scan signal lines used in an (N−1)-th row, an N-th row, an (N+1)-th row, and an (N+2)-th row of the array, respectively; E_N−1, E_N, E_N+1 and E_N+2 represent the light emitting control signal lines used in the (N−1)-th row, the N-th row, the (N+1)-th row, and the (N+2)-th row of the array, respectively; T_N−1, T_N, T_N+1 and T_N+2 respectively represent the time control signal lines used in the (N−1)-th row, the N-th row, the (N+1)-th row, and the (N+2)-th row of the array; D1_M and D2_M represent the data signal lines used in an M-th column of the array; and D1_M+1 and D2_M+1 represent the data signal lines used in an (M+1)-th column of the array. Here, N is, for example, an integer greater than 1, and M is, for example, an integer greater than 0.

For example, the first writing circuits 120 and the compensation circuits 130 in the pixel circuits of each row are all connected with a scan signal line of the current row to receive a first scan signal SN1; the reset circuits 150 in the pixel circuits of each row are connected with a scan signal line of a previous row to receive a reset signal RS, and for example, with respect to the reset circuits 150 in the pixel circuits of a first row, there can be an additional scan signal line which provides a reset signal RS thereto; the second writing circuits 220 in the pixel circuits of each row are connected with a scan signal line of a next row to receive a second scan signal SN2, and for example, with respect to the second writing circuits 220 in the pixel circuits of a last row, there can be another additional scan signal line which provides a second scan signal SN2 thereto; the light emitting control circuits 140 in the pixel circuits of each row are connected with a light emitting control signal line of the current row to receive a light emitting control signal EM; the voltage adjusting circuits 230 in the pixel circuits of each row are connected with a time control signal line of the current row to receive a time control signal TC.

For example, each column of pixel units corresponds to two data signal lines; the first writing circuits 120 and the second writing circuits 220 in odd-sequence pixel circuits in the pixel units of the current column are all connected with one of the two data signal lines, and the first writing circuits 120 and the second writing circuits 220 in even-sequence pixel circuits in the pixel units of the current column are all connected with the other of the two data signal lines (corresponding to the above case in which the first writing circuit 120 and the second writing circuit 220 share a same data signal terminal). And therefore, the first writing circuit 120 and the second writing circuit 220 in each pixel circuit can respectively receive a first data signal Data1 and a second data signal Data2 from a same data signal line. That is to say, each of the two data signal lines can provide the first data signal Data1 and the second data signal Data2 in a time-divisional manner. It should be noted that, the embodiments of the present disclosure include but are not limited thereto. For example, the first writing circuit 120 and the second writing circuit 220 can use different data signal terminals. For example, in some examples (different from the case shown in FIG. 17A), each column of pixel units corresponds to two data signal lines; the first writing circuits 120 in pixel circuits in the pixel units of the current column are all connected with one of the two corresponding data signal lines to receive a first data signal Data1, and the second writing circuits 220 in the pixel circuits in the pixel units of the current column are all connected with the other of the corresponding two data signal lines to receive a second data signal Data2. That is to say, one of the two data signal lines provides only the first data signal Data1, and the other of the two data signal lines provides only the second data signal Data2.

For example, as shown in FIG. 17A, the two data signal lines corresponding to the pixel units of each column can be provided on a same side of the pixel units of the current column; or, different from the case shown in FIG. 17A, the two data signal lines corresponding to pixel units of each column can be provided on different sides of the pixel units of the present column. It should be noted that, specific arrangement manners and positions of the plurality of data signal lines are not limited in the embodiments of the present disclosure. In addition, specific arrangement manners and positions of the plurality of scan signal lines, the plurality of light emitting control signal lines, and the plurality of time control signal lines are not limited in the embodiments of the present disclosure, either.

Figure 17B:
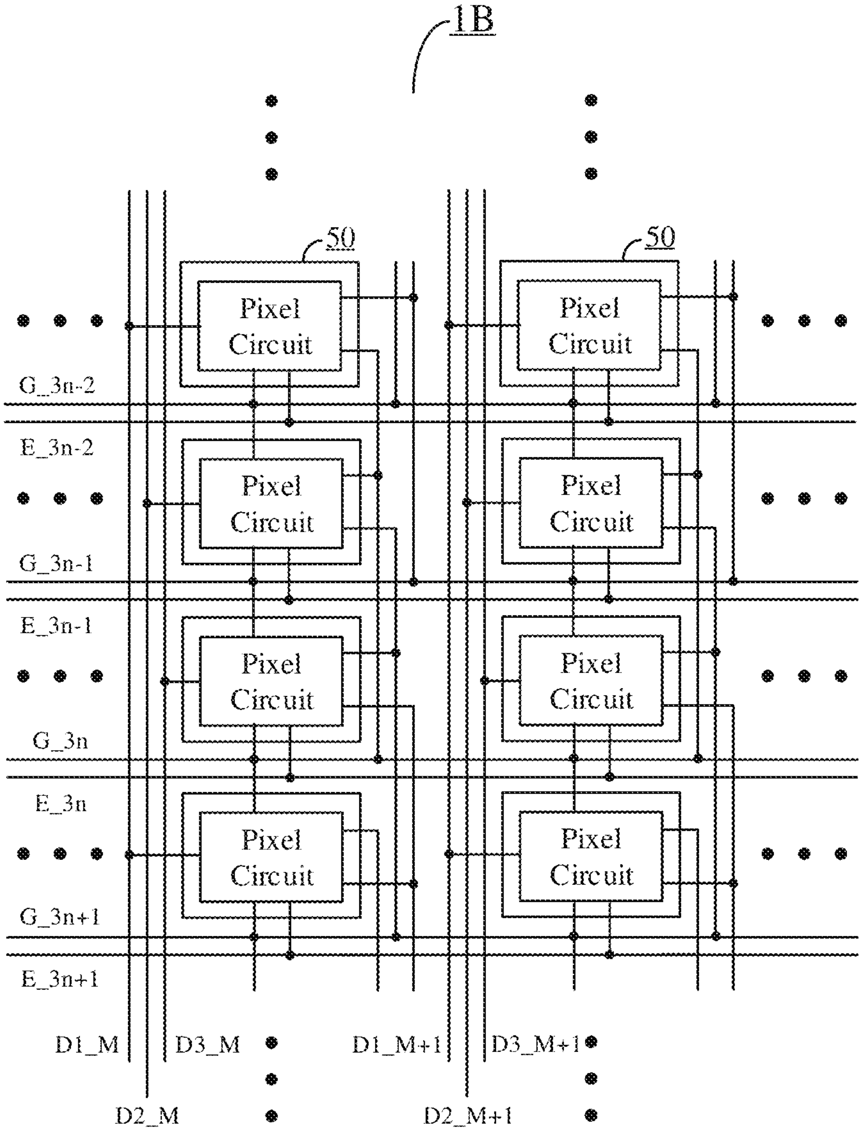
FIG. 17B is a schematic diagram of another array substrate provided by at least one embodiment of the present disclosure.

FIG. 17B is a schematic diagram of another array substrate provided by at least one embodiment of the present disclosure. As shown in FIG. 17B, the array substrate 17B includes a plurality of pixel units 50 arranged in an array, a plurality of scan signal lines, a plurality of light emitting control signal lines, and a plurality of data signal lines. For example, each pixel unit 50 includes the pixel circuit shown in FIG. 6 or FIG. 8, that is, the pixel circuit includes the third writing circuit 240. It should be noted that, only a part of the pixel units 50, the scan signal lines, the light emitting control signal lines, and the data signal lines are shown in FIG. 17B. For example, G_3*n*−2, G_3*n*−1, G_3*n* and G_3*n*+1 represent the scan signal lines used in a (3n−2)-th row, a (3n−1)-th row, a 3n-th row, and a (3n+1)-th row of the array, respectively; E_3*n*−2, E_3*n*−1, E_3*n* and E_3*n*+1 represent the light emitting control signal lines used in the (3n−2)-th row, the (3n−1)-th row, the 3n-th row, and the (3n+1)-th row of the array, respectively; D1_M, D2_M and D3_M represent data signal lines used in an M-th column of the array; and D1_M+1, D2_M+1 and D3_M+1 represent data signal lines used in an (M+1)-th column of the array. Here, N is, for example, an integer greater than 0, and M is, for example, an integer greater than 0.

For example, the first writing circuits 120 and the compensation circuits 130 in the pixel circuits of each row are all connected with a scan signal line of the current row to receive a first scan signal SN1; the reset circuits 150 in the pixel circuits of each row are connected with a scan signal line of a previous row to receive a reset signal RS, and for example, with respect to the reset circuits 150 in the pixel circuits of a first row, there can be an additional scan signal line which provides a reset signal RS thereto; the second writing circuits 220 in the pixel circuits of each row are connected with a scan signal line of a next row to receive a second scan signal SN2, and for example, with respect to the second writing circuits 220 in the pixel circuits of a last row, there can be another additional scan signal line which provides a second scan signal SN2 thereto; the third writing circuits 240 in the pixel circuits of each row are connected with a scan signal line of a row next to the current row by two rows (i.e. a next row of a next row), to receive a third scan signal SN3, and for example, with respect to third writing circuits 240 in the pixel circuits of a second-from-last row, a third scan signal SN3 is provided thereto by the another additional scan signal line described above, and with respect to the third writing circuits 240 in the pixel circuits of a last row, there can be further another additional scan signal line which provides a second scan signal SN2 thereto; and the light emitting control circuits 140 in the pixel circuits of each row are connected with a light emitting control signal line of the current row to receive a light emitting control signal EM For example, each column of pixel units corresponds to three data signal lines; the first writing circuits 120, the second writing circuits 220 and the third writing circuits 240 in the pixel circuits of a (3n−2)-th sequence (n=1, 2, 3, . . . ) in the pixel units of the current column are all connected with a first data signal line (e.g., D1_M, D1_M+1), the first writing circuits 120, the second writing circuits 220 and the third writing circuits 240 in the pixel circuits of a (3n−1)-th sequence (n=1, 2, 3, . . . ) in the pixel units of the current column are all connected with a second data signal line (e.g., D2_M, D2_M+1), the first writing circuits 120, the second writing circuits 220 and the third writing circuits 240 in the pixel circuits of a (3n)-th sequence (n=1, 2, 3, . . . ) in the pixel units of the current column are all connected with a third data signal line (e.g., D3_M, D3_M+1) (corresponding to the above case in which the first writing circuit 120, the second writing circuit 220 and the third writing circuit 240 share a same data signal terminal), so that the first writing circuit 120, the second writing circuit 220 and the third writing circuit 240 in each pixel circuit can respectively receive a first data signal Data1, a second data signal Data2, and a third data signal Data3 from a same data signal line. That is to say, each of the three data signal lines can provide a first data signal Data1, a second data signal Data2, and a third data signal Data3 in a time-divisional manner. It should be noted that, the embodiments of the present disclosure include but are not limited thereto. For example, the first writing circuit 120, the second writing circuit 220, and the third writing circuit 240 can use different data signal terminals. For example, in some examples (different from the case shown in FIG. 17B), each column of pixel units corresponds to three data signal lines; the first writing circuits 120 in the pixel circuits in the pixel units of the current column are all connected with a first data signal line (e.g., D1_M, D1_M+1) to receive a first data signal Data1; the second writing circuits 220 in the pixel circuits in the pixel units of the current column are all connected with a second data signal line (e.g., D2_M, D2_M+1) to receive a second data signal Data2; and the third writing circuits 224 in the pixel circuits in the pixel units of the current column are all connected with a third data signal line (e.g., D3_M, D3_M+1) to receive a third data signal Data3. That is to say, among the three data signal lines, the first data signal line provides only a first data signal Data1, the second data signal line provides only a second data signal Data2, and the third data signal line provides only a third data signal Data3.

It should be noted that, the wirings in the array substrate shown in FIG. 17A and FIG. 17B are illustrative, without being limited in the embodiments of the present disclosure. For example, the wiring manner in the array substrate shown in FIG. 17A or FIG. 17B can simplify the development of layout, and is also suitable for large-sized and high-frame-rate display applications.

Technical effects of the array substrate provided by at least one embodiment of the present disclosure can be referred to the related description of the pixel circuit in the above-described embodiments, and details will not be repeated here.

Figure 18:
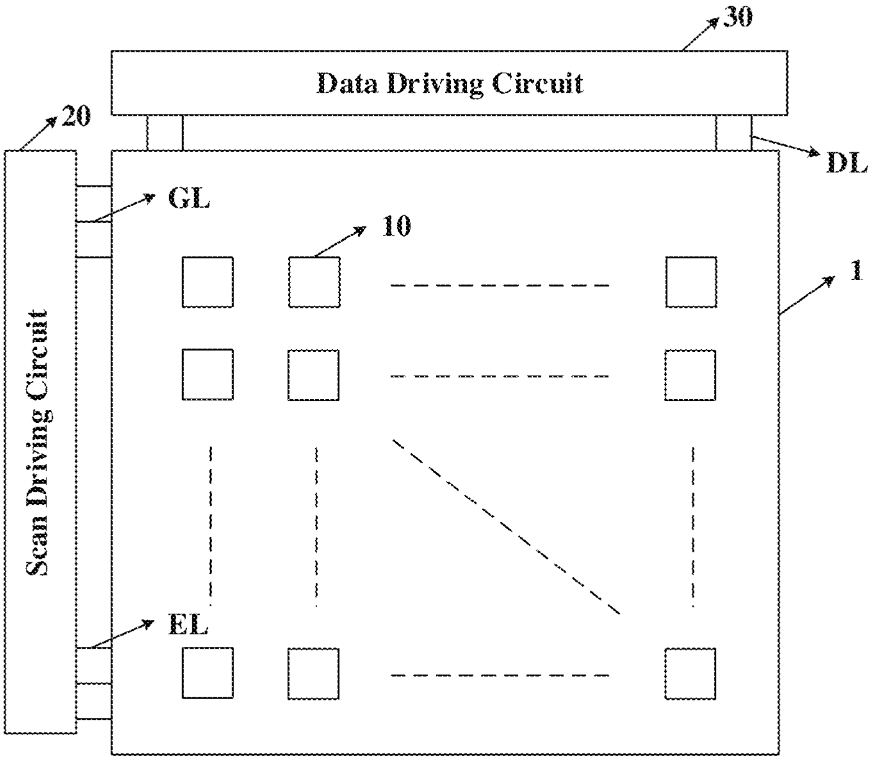
FIG. 18 is a schematic diagram of a display apparatus provided by at least one embodiment of the present disclosure.

At least one embodiment of the present disclosure further provides a display apparatus. FIG. 18 is a schematic diagram of a display apparatus provided by at least one embodiment of the present disclosure. As shown in FIG. 18, the display apparatus can include an array substrate 1 (e.g., the array substrate 1A or 1B described above) provided by any one of the above-described embodiments of the present disclosure, the array substrate 1 includes a plurality of pixel units arranged in an array, and each pixel unit includes a pixel circuit 10 (e.g., the pixel circuit 10, 10A, 10B, or 10C described above) provided by any one of the above-described embodiments of the present disclosure. The display apparatus can further comprise a scan driving circuit 20 and a data driving circuit 30.

For example, the scan driving circuit 20 can be connected with a plurality of scan signal lines GL (e.g., G_N−1, G_N, G_N+1 and G_N+2, etc. in the array substrate 1A shown in FIG. 17A, or G_3n−2, G_3n−1, G_3n and G_3n+1, etc. in the array substrate 1B shown in FIG. 17B), so as to provide a reset signal RS and a scan signal (e.g., a first scan signal SN1, a second scan signal SN2, and a third scan signal SN3); meanwhile, the scan driving circuit 20 can also be connected with a plurality of light emitting control signal lines EL (e.g., E_N−1, E_N, E_N+1 and E_N+2, etc. in the array substrate 1A shown in FIG. 17A, or E_3n−2, E_3n−1, E_3n and E_3n+1, etc. in the array substrate 1B shown in FIG. 17B), so as to provide a light emitting control signal EM. It should be noted that, the reset signal RS, the first scan signal SN1, the second scan signal SN2, and the third scan signal SN3 are all relative terms, and for example, a first scan signal SN1 of the pixel circuits of a certain row can be a reset signal RS of the pixel circuits of a next row, can also be a second scan signal SN2 of the pixel circuits of a previous row, and can also be a third scan signal SN2 of the pixel circuits of a row prior to the current row by two rows (a previous row of a previous row). For example, in some examples (e.g., the array substrate 1 is the array substrate 1A shown in FIG. 17A), the scan driving circuit 20 can also be connected with a plurality of time control signal lines (e.g., T_N−1, T_N, T_N+1 and T_N+2, etc. in the array substrate 1A shown in FIG. 17A, not shown in FIG. 18), so as to provide a time control signal TC. For example, the scan driving circuit can be implemented as an integrated circuit driver chip which is bonded to the array substrate, or the scan driving circuit can also be directly integrated on the array substrate to form a gate driver on array (GOA).

For example, the data driving circuit 30 can be connected with a plurality of data signal lines DL (e.g., D1_M, D2_M, D1_M+1 and D2_M+1, etc. in the array substrate 1A shown in FIG. 17A, or D1_M, D2_M, D3_M, D1_M+1, D2_M+1 and D3_M+1, etc. in the array substrate 1B shown in FIG. 17B), so as to provide data signals (e.g., a first data signal Data1, a second data signal Data2, a third data signal Data3). For example, the data driving circuit 30 can be implemented as an integrated circuit driver chip which is bonded to the array substrate.

For example, the display apparatus can further include other components, such as a timing controller, a signal decoding circuit, a voltage conversion circuit, etc., and these components can adopt conventional components or structures, and details will not be repeated here.

For example, in combination with the driving method of the pixel circuit (referring to the timing diagram shown in FIG. 13 or FIG. 15) described above and the wiring manners of the corresponding array substrate, a progressive scanning process of the display apparatus can be implemented; and for respective stages of each row of pixel circuits, the related description in the embodiment shown in FIG. 13 or FIG. 15 can be referred to. It should be noted that, in the progressive scanning process, control signals such as the scan signal and the light emitting control signal are all applied line by line according to the timing sequences.

For example, the display apparatus in the present embodiment can be any one product or component having a display function, such as a display panel, a display, a television, an electronic paper display apparatus, a mobile phone, a tablet computer, a notebook computer, a digital photo frame, a navigator, etc. It should be noted that the display apparatus can further include other conventional components or structures. For example, in order to achieve the necessary functions of the display apparatus, those skilled in the art can set other conventional components or structures according to specific application scenarios, without being limited in the embodiments of the present disclosure.

Technical effects of the display apparatus provided by at least one embodiment of the present disclosure can be referred to the related description of the pixel circuit in the above-described embodiments, and details will not be repeated here.

For the disclosure, the following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

What have been described above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be determined based on the protection scope of the claims.

What is claimed is:

1. A pixel circuit, comprising a first adjusting circuit and a second adjusting circuit, wherein the first adjusting circuit is configured to receive a first data signal and a light emitting control signal to control a magnitude of a driving current used for driving a light emitting element to emit light;

the second adjusting circuit is configured to receive a second data signal and a time control signal to control a time duration in which the driving current is applied to the light emitting element; and the time control signal changes within a time period during which the light emitting control signal allows the driving current to be generated;

wherein the second adjusting circuit comprises a first control circuit and a second control circuit;

the first control circuit comprises a first control terminal, a first terminal and a second terminal;

the second control circuit is configured to control an electric level of the first control terminal of the first control circuit based on the second data signal and the time control signal, so as to control a time duration in which the driving current flows through the first terminal and the second terminal of the first control circuit.

2. The pixel circuit according to claim 1, wherein the first control circuit comprises a control transistor;

a gate electrode of the control transistor serves as the first control terminal of the first control circuit and is electrically connected with the second control circuit, a first electrode of the control transistor serves as the first terminal of the first control circuit, and a second electrode of the control transistor serves as the second terminal of the first control circuit.

3. The pixel circuit according to claim 1, wherein the second control circuit comprises a second writing circuit and a voltage adjusting circuit;

the second writing circuit is configured to write the second data signal into a first node in response to a second scan signal;

the voltage adjusting circuit is configured to store the second data signal being written, and to adjust an electric level of the first node in response to the time control signal.

4. The pixel circuit according to claim 3, wherein the second control circuit further comprises a third writing circuit;

the third writing circuit is configured to write a third data signal into the voltage adjusting circuit as the time control signal in response to a third scan signal.

5. The pixel circuit according to claim 4, wherein the second writing circuit comprises a second writing transistor, and the voltage adjusting circuit comprises a voltage adjusting transistor and a second storage capacitor;

a gate electrode of the second writing transistor is connected with a second scan signal terminal to receive the second scan signal, a first electrode of the second writing transistor is connected with a second data signal terminal to receive the second data signal, and a second electrode of the second writing transistor is connected with the first node;

a gate electrode of the voltage adjusting transistor is connected with a time control signal terminal to receive the time control signal, a first electrode of the voltage adjusting transistor is connected with a first power terminal to receive a first power voltage, and a second electrode of the voltage adjusting transistor is connected with the first node;

a first terminal of the second storage capacitor is connected with the first node, and a second terminal of the second storage capacitor is connected with the first power terminal to receive the first power voltage.

6. The pixel circuit according to claim 5, wherein the voltage adjusting circuit further comprises a time control resistor, and the first electrode of the voltage adjusting transistor is connected with the first power terminal through the time control resistor.

7. The pixel circuit according to claim 5, wherein the third writing circuit comprises a third writing transistor and a third storage capacitor;

a gate electrode of the third writing transistor is connected with a third scan signal terminal to receive the third scan signal, a first electrode of the third writing transistor is connected with a third data signal terminal to receive the third data signal, and a second electrode of the third writing transistor is connected with the gate electrode of the voltage adjusting transistor;

a first terminal of the third storage capacitor is connected with the gate electrode of the voltage adjusting transistor, and a second terminal of the third storage capacitor is connected with the first electrode of the voltage adjusting transistor.

8. The pixel circuit according to claim 3, wherein the first control terminal of the first control circuit is connected with the first node.

9. The pixel circuit according to claim 3, wherein the second control circuit further comprises an inverter circuit, the inverter circuit comprises an input end and an output end, the input end of the inverter circuit is connected with the first node, the output end of the inverter circuit is connected with the first control terminal of the first control circuit; the inverter circuit is configured, according to an input signal received by the input end, to generate an output signal having a phase inverse to that of the input signal, and to output the output signal to the first control terminal of the first control circuit.

10. The pixel circuit according to claim 9, wherein the inverter circuit comprises a first transistor and a second transistor;

a type of the first transistor is different from a type of the second transistor;

a gate electrode of the first transistor and a gate electrode of the second transistor are connected with the first node, a second electrode of the first transistor and a second electrode of the second transistor are connected with the first control terminal of the first control circuit, a first electrode of the first transistor is connected with a first voltage terminal to receive a first voltage, a first electrode of the second transistor is connected with a second voltage terminal to receive a second voltage, and the first voltage is different from the second voltage.

11. The pixel circuit according to claim 1, wherein the first adjusting circuit comprises a driving circuit, a first writing circuit, a compensation circuit and a light emitting control circuit;

the driving circuit comprises a second control terminal, a third terminal and a fourth terminal, and is configured to control the driving current flowing through the third terminal and the fourth terminal of the driving circuit and used for driving the light emitting element to emit light;

the first writing circuit is configured to write the first data signal into the second control terminal of the driving circuit in response to a first scan signal;

the compensation circuit is configured to store the first data signal being written and compensate the driving circuit in response to the first scan signal;

the light emitting control circuit is configured to apply a second power voltage to the third terminal of the driving circuit in response to the light emitting control signal.

12. The pixel circuit according to claim 11, wherein the driving circuit comprises a driving transistor, the first writing circuit comprises a first writing transistor, the compensation circuit comprises a compensation transistor and a first storage capacitor, the light emitting control circuit comprises a light emitting control transistor;

a gate electrode of the driving transistor serves as the second control terminal of the driving circuit and is connected with a second node, a first electrode of the driving transistor serves as the third terminal of the driving circuit and is connected with a third node, a second electrode of the driving transistor serves as the fourth terminal of the driving circuit and is connected with a fourth node;

a gate electrode of the first writing transistor is connected with a first scan signal terminal to receive the first scan signal, a first electrode of the first writing transistor is connected with a first data signal terminal to receive the first data signal, and a second electrode of the first writing transistor is connected with the third node;

a gate electrode of the compensation transistor is connected with the first scan signal terminal to receive the first scan signal, a first electrode of the compensation transistor is connected with the fourth node, a second electrode of the compensation transistor is connected with the second node, a first terminal of the first storage capacitor is connected with the second node, and a second terminal of the first storage capacitor is connected with a second power terminal;

a gate electrode of the light emitting control transistor is connected with a light emitting control signal terminal to receive the light emitting control signal, a first electrode of the light emitting control transistor is connected with the second power terminal to receive the second power voltage, and a second electrode of the light emitting control transistor is connected with the third node.

13. The pixel circuit according to claim 12, wherein the first adjusting circuit further comprises a reset circuit;

the reset circuit is configured to apply a reset voltage to the second control terminal of the driving circuit in response to a reset signal.

14. The pixel circuit according to claim 13, wherein the reset circuit comprises a reset transistor;

a gate electrode of the reset transistor is connected with a reset signal terminal to receive the reset signal, a first electrode of the reset transistor is connected with a reset voltage terminal to receive the reset voltage, and a second electrode of the reset transistor is connected with the second node.

15. The pixel circuit according to claim 11, wherein the first terminal of the first control circuit is connected with the fourth terminal of the driving circuit, the second terminal of the first control circuit is connected with a first electrode of the light emitting element, and a second electrode of the light emitting element is connected with a third power terminal to receive a third power voltage.

16. An array substrate, comprising a plurality of pixel units arranged in an array; wherein each of the plurality of pixel units comprises a light emitting element and a pixel circuit, the pixel circuit comprises a first adjusting circuit and a second adjusting circuit;

the first adjusting circuit is configured to receive a first data signal and a light emitting control signal to control a magnitude of a driving current used for driving the light emitting element to emit light;

the second adjusting circuit is configured to receive a second data signal and a time control signal to control a time duration in which the driving current is applied to the light emitting element; and the time control signal changes within a time period during which the light emitting control signal allows the driving current to be generated;

wherein the second adjusting circuit comprises a first control circuit and a second control circuit;

the first control circuit comprises a first control terminal, a first terminal and a second terminal;

the second control circuit is configured to control an electric level of the first control terminal of the first control circuit based on the second data signal and the time control signal, so as to control a time duration in which the driving current flows through the first terminal and the second terminal of the first control circuit.

17. The array substrate according to claim 16, wherein the light emitting element in the pixel unit comprises a micron-sized light emitting element.

18. A display apparatus, comprising: the array substrate according to claim 16.

19. A driving method of a pixel circuit, wherein the pixel circuit comprises a first adjusting circuit and a second adjusting circuit, the first adjusting circuit is configured to receive a first data signal and a light emitting control signal to control a magnitude of a driving current used for driving a light emitting element to emit light, the second adjusting circuit is configured to receive a second data signal and a time control signal to control a time duration in which the driving current is applied to the light emitting element, and the time control signal changes within a time period during which the light emitting control signal allows the driving current to be generated; the second adjusting circuit comprises a first control circuit and a second control circuit; the first control circuit comprises a first control terminal, a first terminal and a second terminal; the second control circuit is configured to control an electric level of the first control terminal of the first control circuit based on the second data signal and the time control signal, so as to control a time duration in which the driving current flows through the first terminal and the second terminal of the first control circuit; and the driving method comprises:

causing the first adjusting circuit to receive the first data signal and the light emitting control signal, and controlling the magnitude of the driving current used for driving the light emitting element; and causing the second adjusting circuit to receive the second data signal and the time control signal, and controlling the time duration in which the driving current is applied to the light emitting element, wherein the time control signal changes within the time period during which the light emitting control signal allows the driving current to be generated.

20. The driving method according to claim 19, wherein the driving method comprises a light emitting stage, wherein in the light emitting stage, cause the second control circuit to control the electric level of the first control terminal of the first control circuit based on the second data signal and the time control signal, so as to change the first control circuit from an on state to an off state, so that the time duration in which the driving current flows through the first terminal and the second terminal of the first control circuit is controlled.

* * * * *